Figure 18:
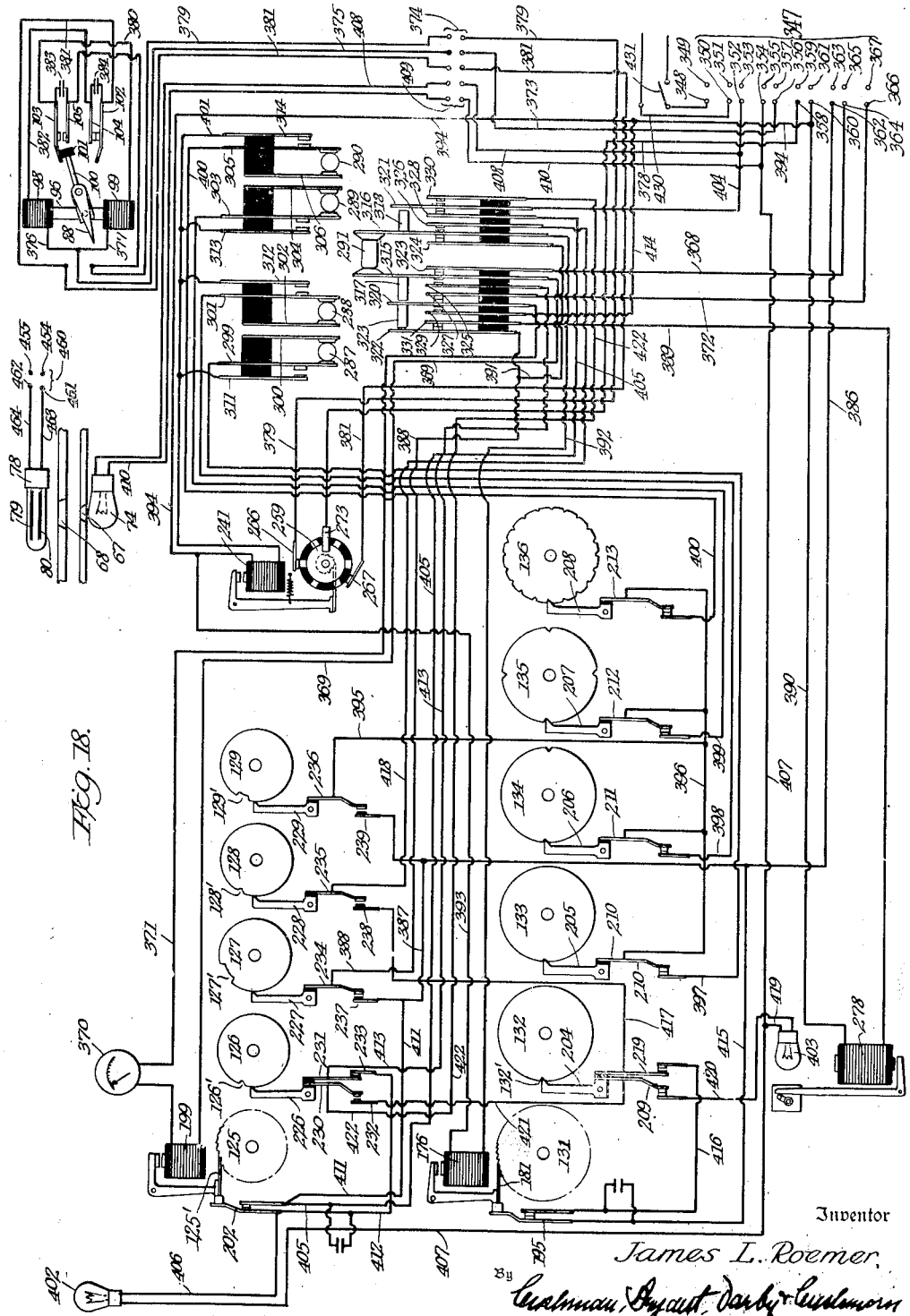

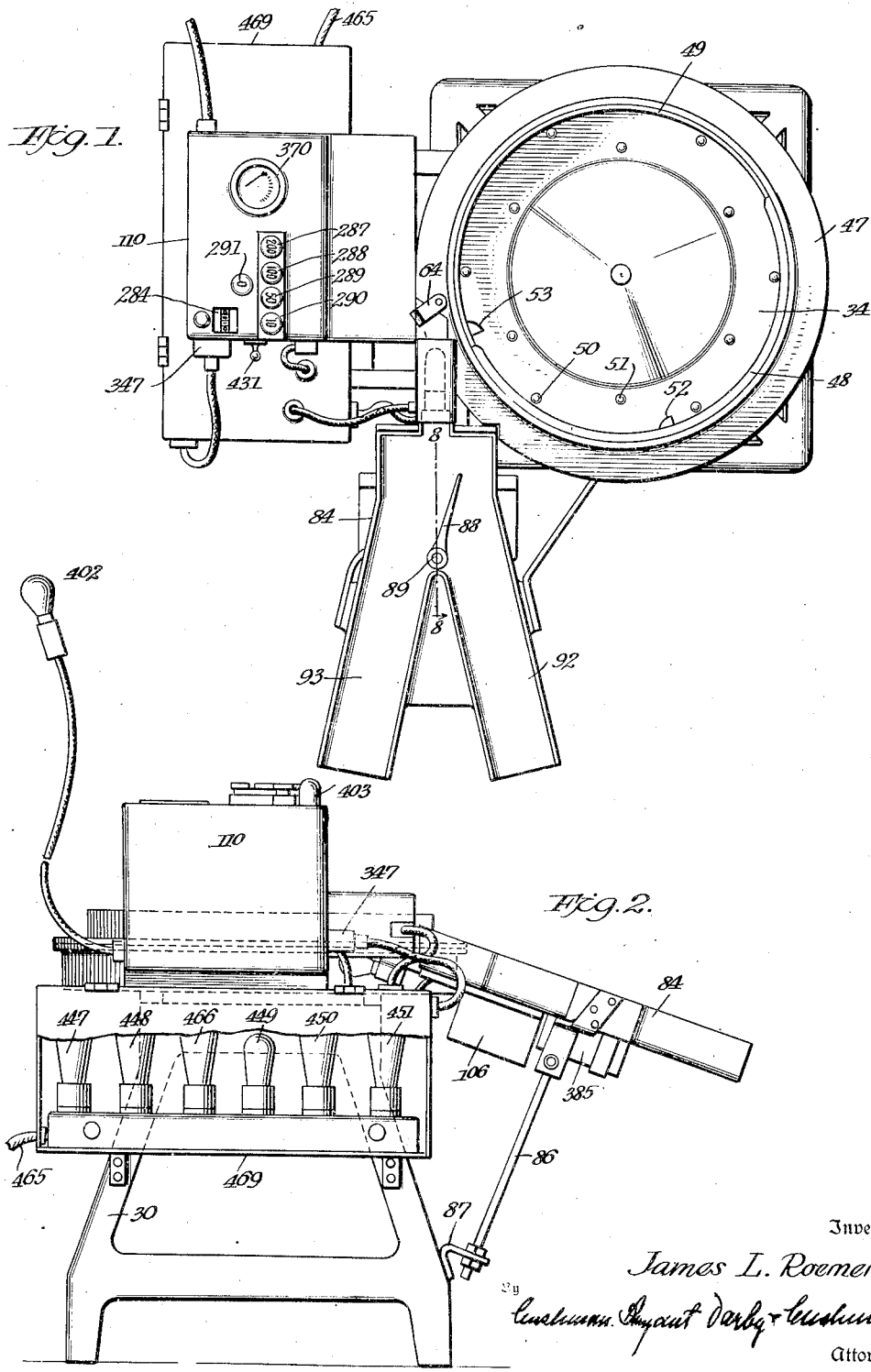

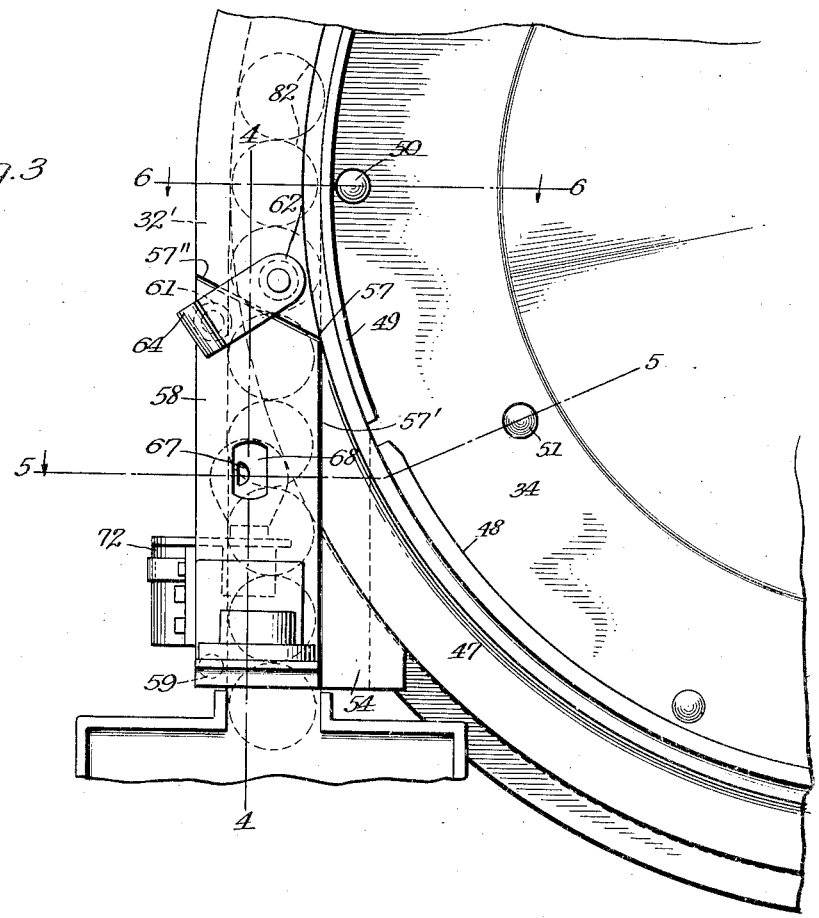
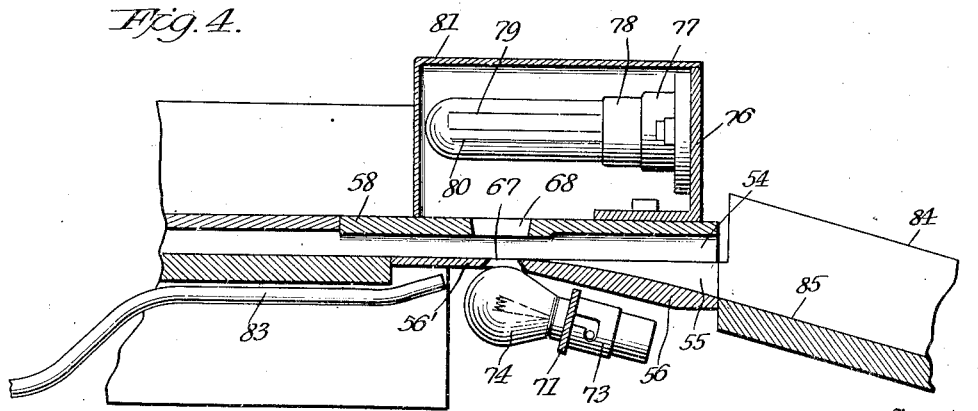

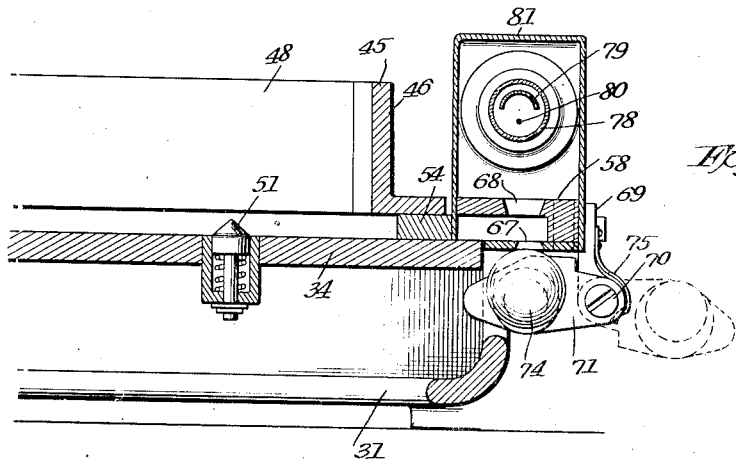
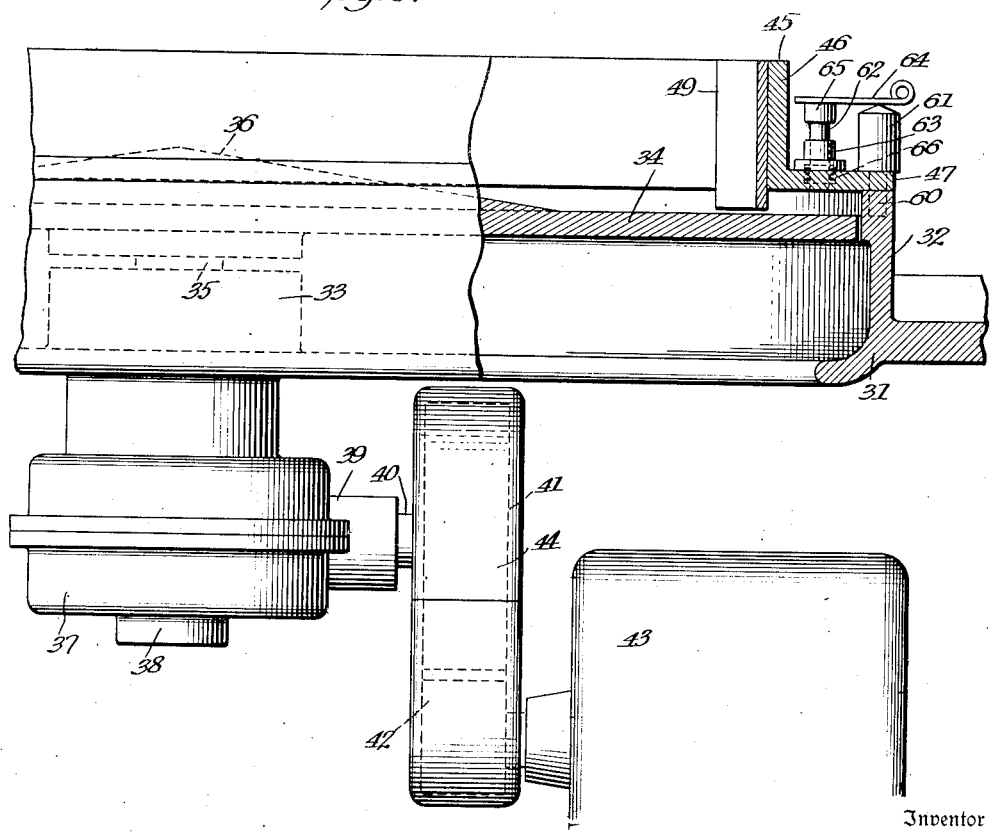

Nov. 3, 1936.                J. L. ROEMER                2,059,398
                           COUNTING APPARATUS
                       Filed Sept. 12, 1931        11 Sheets-Sheet 4
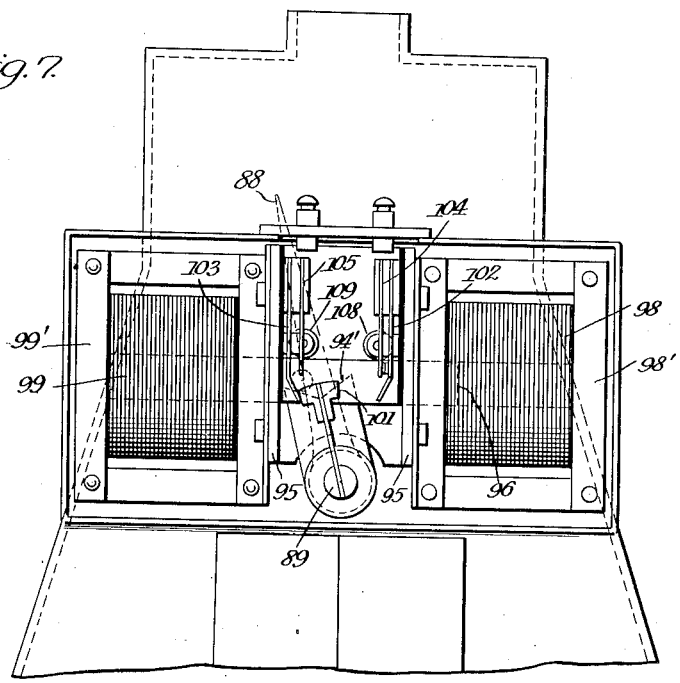
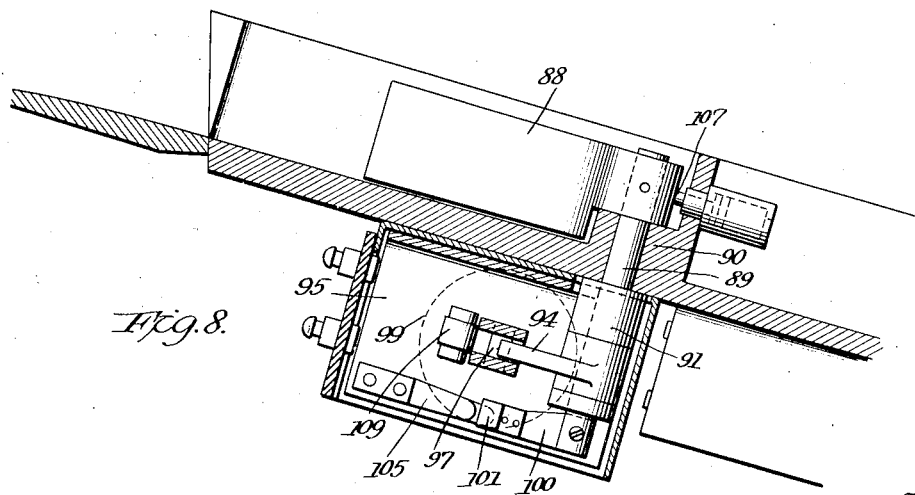
Inventor
James L. Roemer
By Cullman, Bryant Darby & Cushman
Attorneys

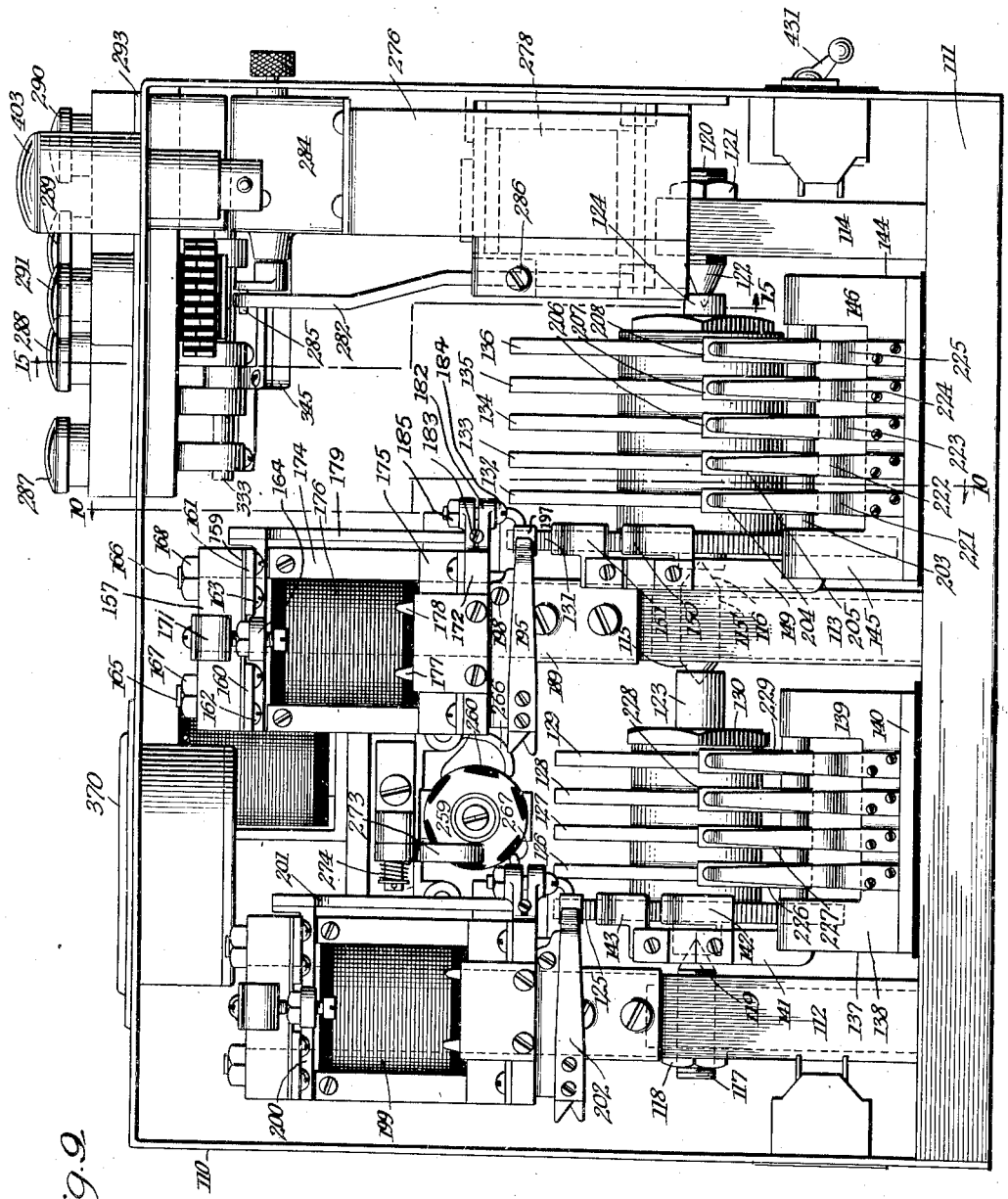

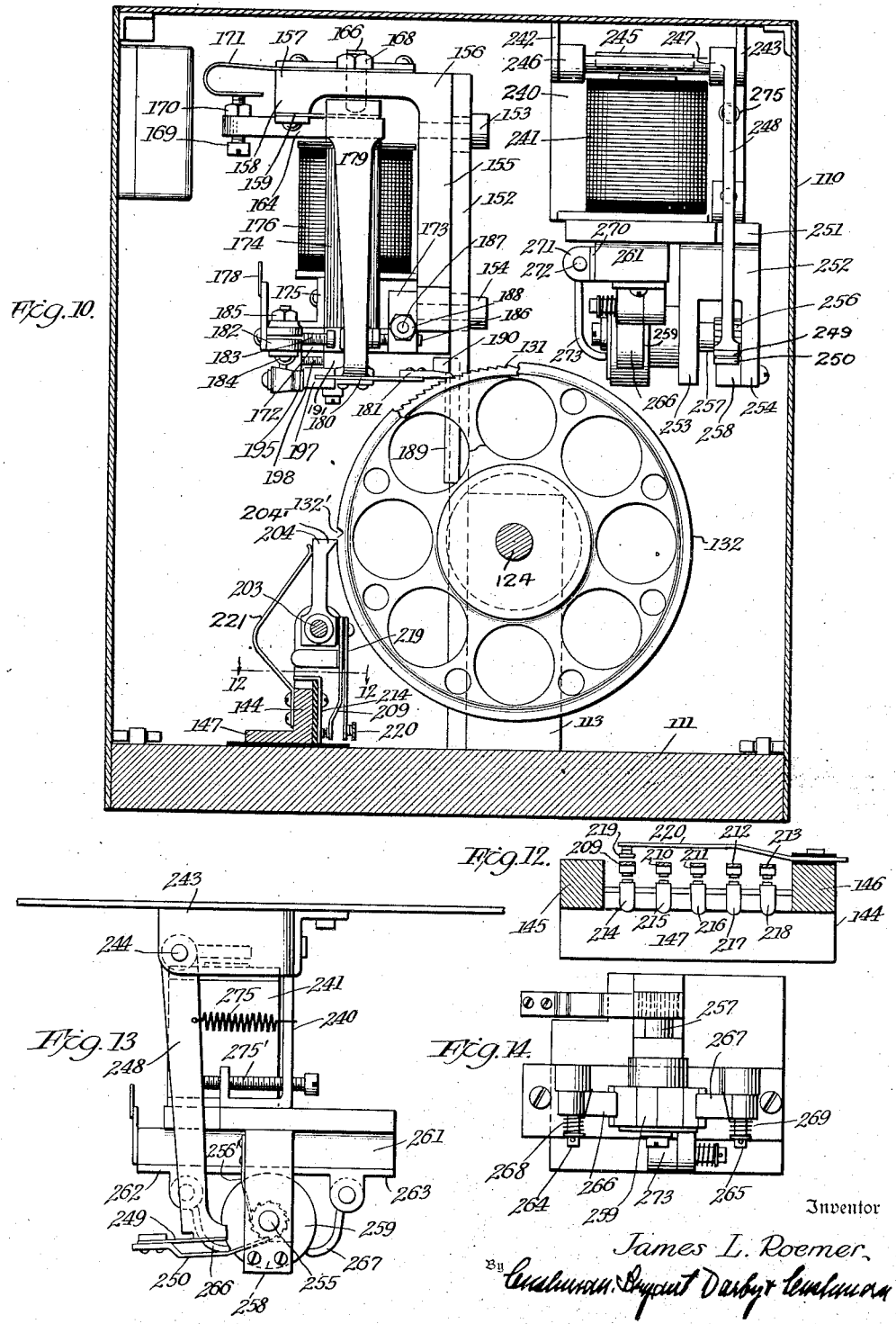

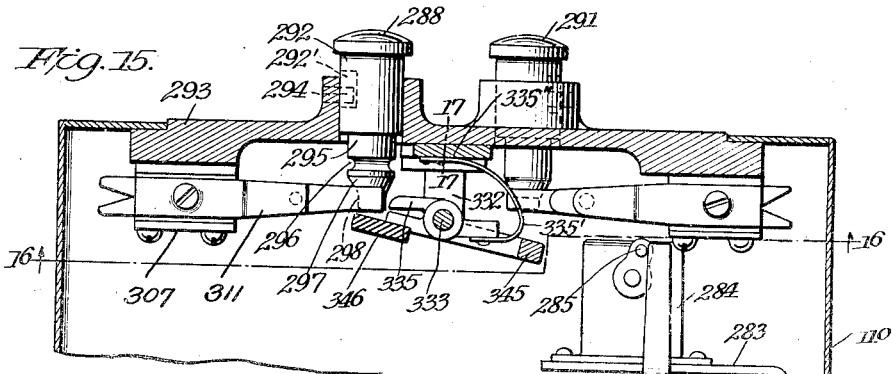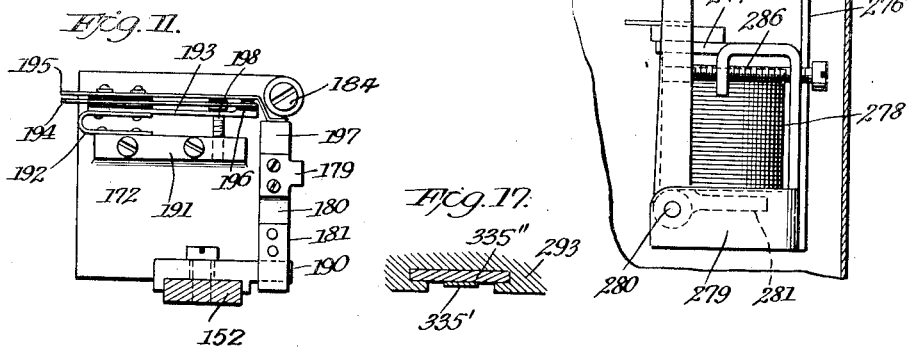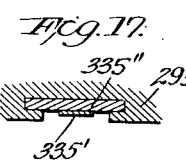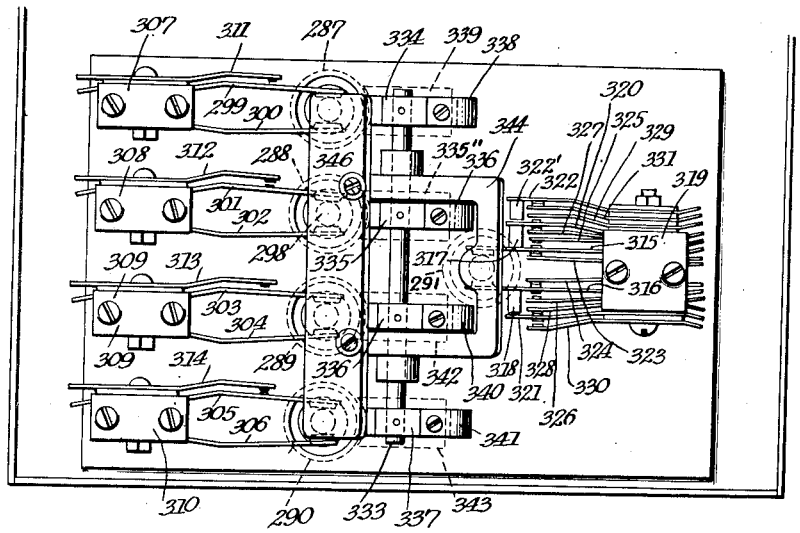

Nov. 3, 1936.    J. L. ROEMER    2,059,398
COUNTING APPARATUS
Filed Sept. 12, 1931    11 Sheets-Sheet 8

Inventor
James L. Roemer,
By Cushman, Byrant, Darby & Cushman
Attorneys

Nov. 3, 1936.　　　　　J. L. ROEMER　　　　　2,059,398
COUNTING APPARATUS
Filed Sept. 12, 1931　　　11 Sheets-Sheet 11
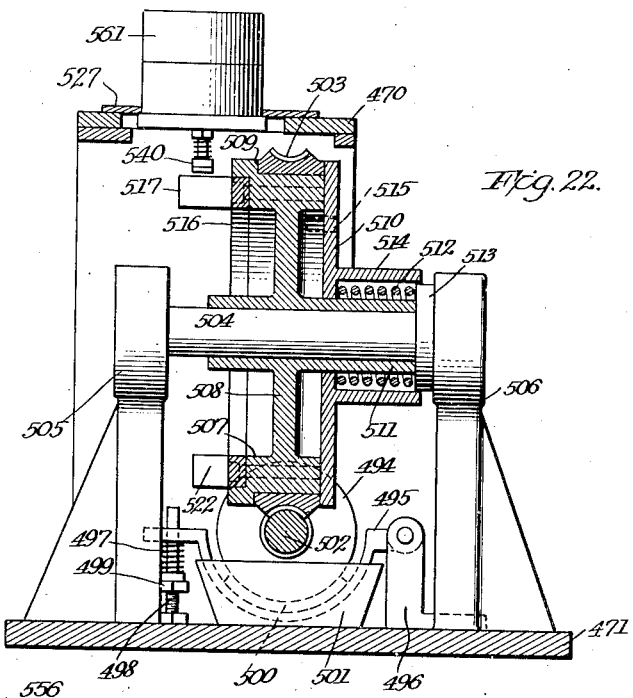
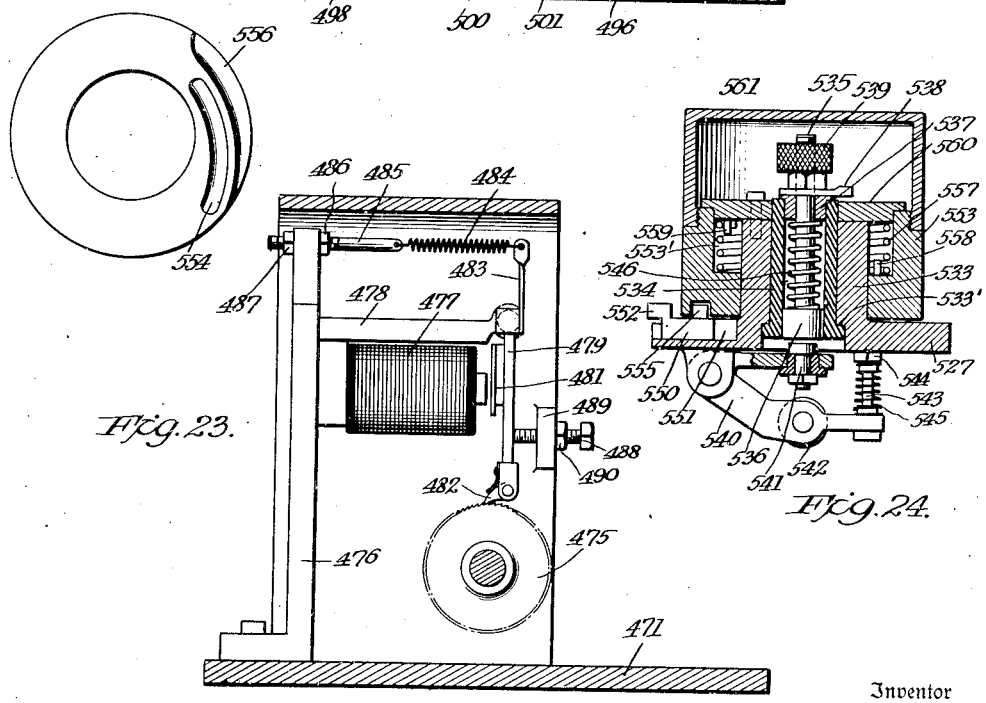
Inventor
James L. Roemer
By Cushman, Bryant, Darby & Cushman
Attorneys Patented Nov. 3, 1936

2,059,398

UNITED STATES PATENT OFFICE 2,059,398

COUNTING APPARATUS

James L. Roemer, Baltimore, Md., assignor to Crown Cork & Seal Company, Inc., Baltimore, Md., a corporation of New York Application September 12, 1931, Serial No. 562,543

15 Claims. (Cl. 235—98)

The present invention relates to means for counting articles or objects particularly of such small size that their accurate counting has heretofore been considered more or less impracticable, however desirable. For example, in the manufacture of crown caps and similar closure elements no practical machine has heretofore been designed capable of economically, rapidly and accurately counting the caps. Packaging by weight has accordingly been resorted to with the result that packages containing equal weights often vary considerably as to count due to slight non-uniformities of the metal stock from which the caps are made, of the cork inserts, or of the coating materials, etc.

The devices of the present invention have been designed with a view to enabling rapid and accurate count of articles such as crown caps to be economically made, and while the invention will be described with reference to devices particularly adapted to handle crown caps it is to be understood that it is by no means limited to this particular application. Speaking generally, the new apparatus is adapted to count articles which are of such shape that when fed in line in mutually contacting relation, the contact area between contiguous articles is less than the transverse dimension of the articles so that spaces exist between the articles.

According to the invention, means are provided for rapidly feeding a succession of crown caps, guiding them in intermitting relation between a source of light and a light-sensitive cell, and utilizing the resultant impulses to actuate a units counter which in turn affects an adding counter. The adding counter controls a discharge chute control gate to the end that as soon as a desired count has been made the gate will be moved to divert the caps from one discharge path to another. Preferably the units wheel is designed to count one gross for each revolution, each revolution of the units wheel being passed to the adding mechanism to cause a unit movement of the latter.

The adding mechanism is selectively settable so that various counts may be secured. For example, the mechanism may be set to swing the gate after a count of ten gross, fifty gross, etc. With the mechanism set for a given count it will continue to actuate the gate after the completion of such count as long as caps are fed. If it is desired to change the count, feed is interrupted and the mechanism set for the new count whereupon the gate will be actuated at the proper intervals as long as feed is continued.

Figure 19:
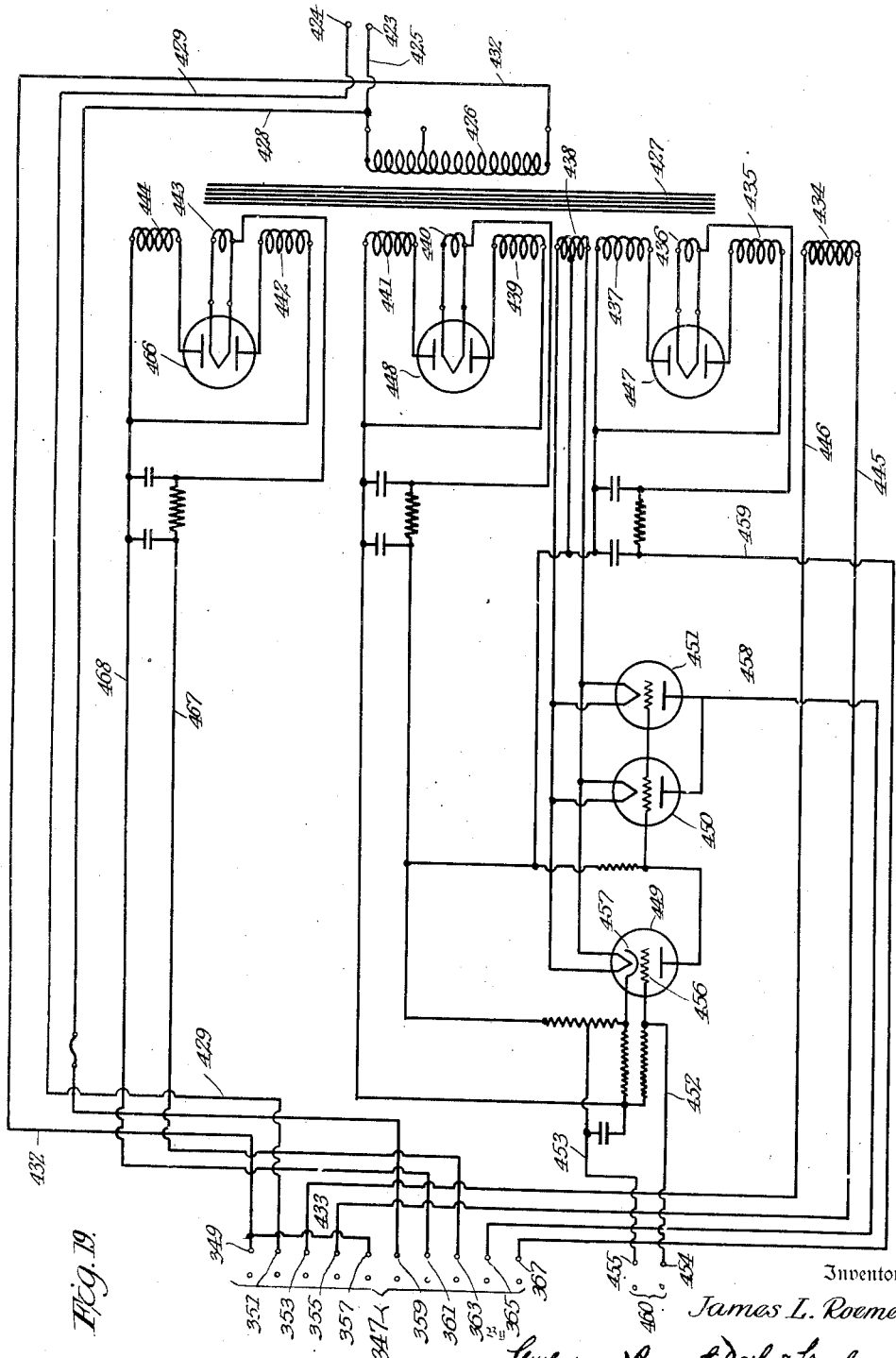
Figure 20:
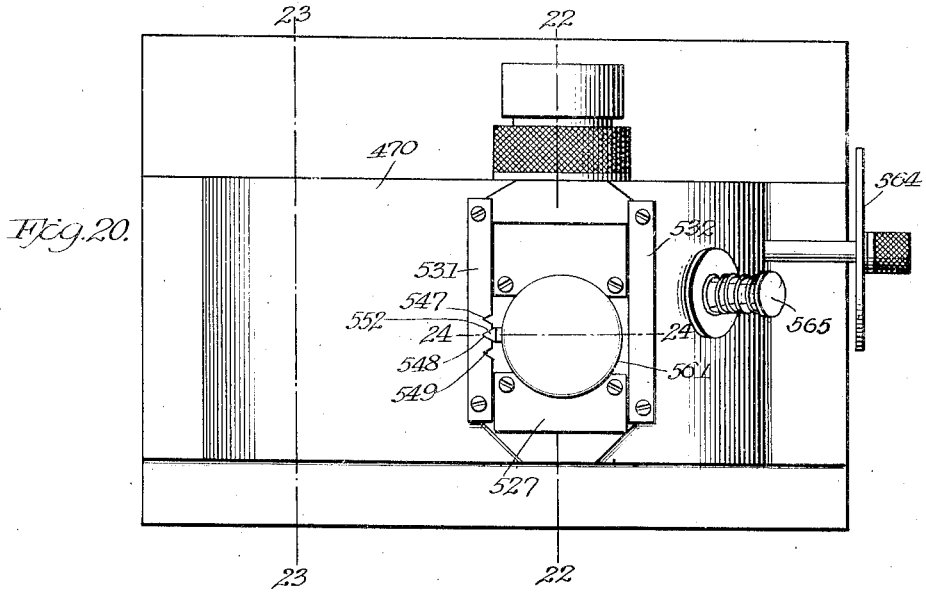
Figure 21:
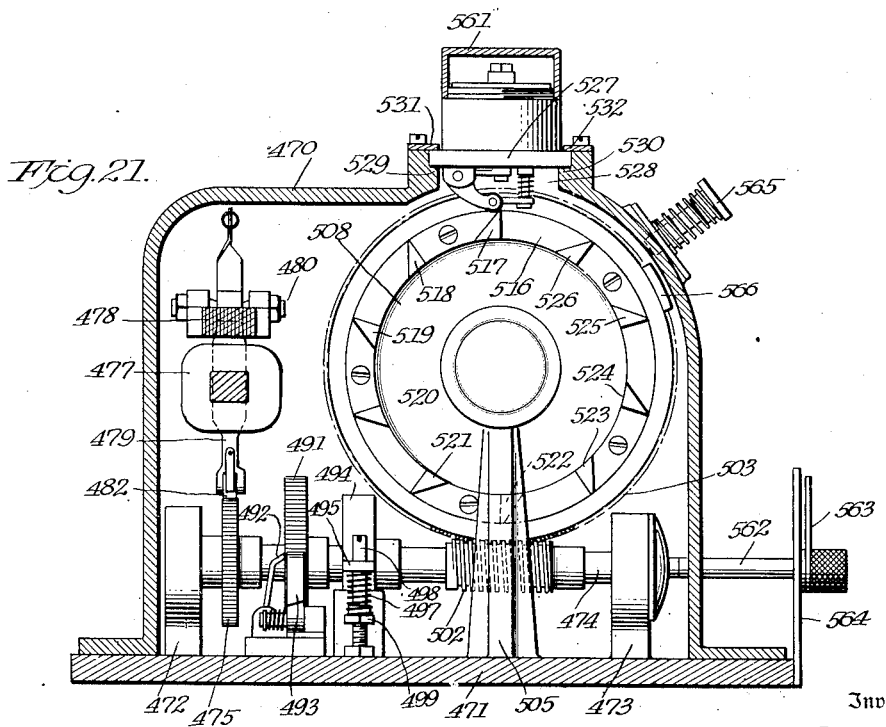

In order that the invention may be fully understood, I have illustrated two practical embodiments thereof in the accompanying drawings. Both embodiments have many features in common, as will appear. In the drawings, Figure 1 is a plan view of one embodiment of the invention, Figure 2 is an elevation of the embodiment shown in Figure 1, Figure 3 is an enlargement in plan of a portion of the mechanism shown in Figure 1, Figure 4 is a section on line 4—4 of Figure 3, Figure 5 is a section on line 5—5 of Figure 3, Figure 6 is an enlargement in elevation of mechanism comprised in the embodiment of Figure 1, parts being shown in section on line 6—6 of Figure 3, Figure 7 is an enlarged bottom plan view of mechanism comprised in the embodiment of Figure 1, Figure 8 is a section substantially on the line 8—8 of Figure 1, Figure 9 is an elevation of counting mechanism comprised in the embodiment of Figure 1, Figure 10 is a section on line 10—10 of Figure 9, Figure 11 is a bottom plan view of mechanism appearing in Figures 9 and 10 in elevation, Figure 12 is a section on line 12—12 of Figure 10, Figure 13 is a different elevation of mechanism appearing in other elevations in Figures 9 and 10, Figure 14 is a bottom plan view of the mechanism of Figure 13, Figure 15 is a section on line 15—15 of Figure 9, Figure 16 is a section on line 16—16 of Figure 15, Figure 17 is a section on line 17—17 of Figure 15, Figures 18 and 19 are circuit diagrams, Figure 20 is an elevation of a modified form of counting mechanism, Figure 21 is a sectional view of the counter of Figure 20, Figure 22 is a section on line 22—22 of Figure 20, Figure 23 is a section on line 23—23 of Figure 20, Figure 24 is a section on line 24—24 of Figure 20, and Figure 25 is a face view of a cam ring.

I shall first describe the embodiment of the invention shown in Figures 1 to 19 of the drawings, these figures illustrating the complete system. For the sake of convenience in the following description I shall consider the apparatus as comprising three main divisions, namely (1) the feeding mechanism, the discharge gate and its operating mechanism, and the photo-electric cell and lamp arrangement; (2) the counting mechanism actuated from the photo-electric cell circuit and the control means for the discharge gate operating mechanism; and (3) the circiut arrangement. The description will proceed in this order.

Referring to Figures 1 to 8, reference numeral 30, Figure 2, designates generally a stand adapted to support the entire apparatus. The stand 30 supports at its top a horizontal ring 31 having a circular upright wall 32. A spider integral with the lower portion of the ring supports a bearing boss 33 having a vertical bore concentric with the circular wall 32. A circular horizontal plate 34 has a running fit with circular wall 32 and is centrally supported on a shaft 35 journaled in the aperture of boss 33. Disc 34 has a conically elevated central portion 36 sloped downwardly to the outer portion of the disc. A split housing 37 is fixed to the spider below boss 33 and encloses a worm wheel (not shown) fixed on shaft 35, the shaft being stepped in the portion 38 of the housing. The housing 37 includes a bearing portion 39 for a high pitch worm which engages the worm wheel, the worm being fixed on shaft 40 to which is also fixed a spur gear 41 meshing with the armature pinion 42 of an electric motor 43. The gear and pinion are enclosed in a suitable housing 44.

It will be noted from Figure 6 that the upper edge of circular wall 32 projects above plate 34, the extent of this projection being governed by the nature of the article to be fed. The present machine being designed particularly for the handling of crown caps, wall 32 projects above plate 34 a distance slightly greater than the height of a cap. A ring 45 presenting a vertical web 46 and a horizontal web 47 has the latter secured at its margins to the top of wall 32 with the inner periphery of web 46 concentric with wall 32 and spaced inwardly from the latter a distance somewhat greater than the diameter of a crown cap.

Secured against the inner periphery of web 46 is a substantially semi-circular strip 48 whose lower edge is spaced above plate 34 a distance somewhat greater than the height of a cap. A complementary semi-circular strip 49 is secured to the inner periphery of the web 46 with its lower edge close to the top surface of the disc.

With the plate 34 rotating in counterclockwise direction, Figure 1, caps thereon will be centrifugally projected and may pass freely beneath the strip 48 into guided contact with the upper end of wall 32. Upon reaching this position the caps are carried around at substantially the peripheral speed of the plate and eventually enter behind strip 49. Plate 34 is provided on its outer flat portion with two concentric series of depressible buttons 50 and 51 which serve to agitate the caps on the plate. The outer series of buttons 50 is just clear of the semi-circular strips and considering a cap to be in abutment against the leading edge of strip 49, the buttons 50 will insure that the cap is moved either inwardly or outwardly of the strip so as to prevent jamming. Also, fixed baffles 52 and 53 projecting inwardly of strips 48 and 49 and extending from top to bottom of the latter are provided for the purpose of deflecting superposed caps toward the center of the plate and thereby freeing the bottom layer for passage under strip 48.

From the description thus far it will be evident that the described mechanism is adapted to receive loose caps and quickly arrange them in a circular rapidly moving line guided between the outer and inner wall portions 32 and 49. Caps are delivered onto the plate 34 from a conveyor leading from one or several cap making machines, the feeding mechanism having large capacity, dependent, of course, upon the speed at which plate 34 is rotated. The mechanism is capable of feeding several thousand caps per minute.

At the trailing end of strip 49, wall 32 is interrupted and a strip 54 is secured beneath web 47 with its outer straight edge substantially tangential to the outer periphery of strip 49. Secured to the outer end of strip 54 for support thereby free of plate 34, is a guide member having an angular vertical wall portion 55 flush with the straight outer surface of strip 54 and a bottom wall 56 inclined upwardly to a horizontal portion 56' flush with the top of plate 34 and curved in conformity with the plate. Also adjacent the trailing end of strip 49, web 47 is provided with an oblique cut-out 57, Figure 3, whose edge 57' is directly above the outer edge of strip 54 and is parallel thereto. Adjacent the edge 57'' of the cut-out, wall 32 is somewhat outwardly flared as at 32' so that its inner surface is substantially parallel to the edge of strip 54. An angle strip 58 has vertical and horizontal web portions, the former having a horizontal lower edge extending throughout the length of the bottom wall 56 and resting on the horizontal portion 56' of the latter, and is of such height as to position the horizontal web with its undersurface in the plane of the undersurface of web 47. The top web of angle strip 58 has its forward edge intersecting its inner lateral edge at an angle similar to that of the cut-out 57. At its outer rearward point, strip 58 is pivoted by means of a vertical screw indicated at 59, Figure 3, to the top of an outer side wall which extends upwardly from the inclined portion of bottom wall 56 and is similarly shaped to the inner side wall 55, the distance between these two side walls being somewhat greater than the diameter of a cap. Thus the strip 54, the guide member with its bottom wall 56 and side walls, and the angle strip 58 with its vertical and horizontal webs, constitute a rectilinear chute, as to horizontal direction, in continuation of and tangential to the chute defined by wall 32, web 47, strip 49 and the outer margin of plate 34.

At its point longitudinally spaced from pivot pin 59, the vertical web of strip 58 is provided with a vertical bore registering, in the position of parts shown in Figure 3, with a vertical bore in wall 32, the registering bores being adapted to receive a pin 60 having an upwardly projecting head 61, the pin serving to hold the strip in the illustrated position. A pin 62 is reciprocable in a collar 63 mounted on the horizontal web of strip 58 and in a vertical aperture passing through said web. A horizontally extending lever 64 is fixed to the top of pin 63 through a boss 65 and within a recess 66 is arranged a spring urging pin 62 downwardly. In its downward limit the pin projects between wall 32 and strip 49 so as to block the passageway defined thereby so that the cap feed is stopped. The pin may be lifted by means of lever 64 free of the passageway and retained in unobstructed relation thereto by lever 64 which is swung over the top of head 61 to rest thereon. Thus pin 60 cannot be removed until lever 64 has been swung therefrom to release pin 62 for downward movement into obstructing relation to the passageway. With pin 60 removed, strip 58 may be swung outwardly about pin 59 to expose bottom wall 56.

Bottom wall 56 is provided with an aperture 67, Figures 3, 4, and 5, to one side of its longitudinal central line, the aperture being upwardly tapered and of substantially semi-circular shape with its diameter adjacent the vertical web of strip 58. The horizontal web of strip 58 is provided above aperture 67 with an aperture 68 somewhat larger than the former and tapering slightly downwardly. A bracket 69 secured to the vertical web of strip 58 adjacent pivot 59 has at its lower edge a horizontally extending cylindrical enlargement bored and tapped to receive a screw 70 which pivotally supports a swingable bracket 71 through a boss portion 72 of the latter. Bracket 71 carries a lamp socket 73 in which is engaged a bulb 74 positioned in the full line position, Figure 5, immediately beneath aperture 67. A spring detent 75 mounted on bracket 69 cooperates with notches formed in boss 72 to retain bracket 71 in the full line position of Figure 5 or in the dotted line position wherein the bracket has been swung to render the bulb accessible for replacement.

An angle bracket 76 having a foot portion fixed to the top of the horizontal web of strip 58 supports a socket 77 in which is engaged a photoelectric cell 78 with its cathode 79 and anode 80 positioned directly above aperture 68. A housing 81, mounted in a manner which will be evident from Figures 4 and 5, is provided for the cell.

The bulb and cell, it will be evident, are positioned at opposite ends of the light passage defined by apertures 67 and 68 so that the latter may be affected by the former. The caps in their passage along the horizontal chute portion, however, pass between apertures 67 and 68 to intermit the energization of the cell by the source of light. Ordinarily the caps are fed in the substantially diametrically contacting relation indicated in Figure 3, the caps being designated by the reference numeral 82. For this reason the apertures, as has been mentioned, are positioned to one side of the central longitudinal line of the rectilinear chute portion so that light from the source can reach the cell through the aligned angular spaces existing between the caps laterally of their line of contact. It will be evident that with two adjacent caps passing under the chute, one faced upwardly and the other downwardly, an overlapping contact area will exist which would serve to exclude the passage of light between them if the light apertures were centrally arranged in the top and bottom chute walls. With the described arrangement, however, the cell energizing beam will be permitted to pass between successive caps without fail. To forestall such light diffusion as might accidentally affect the cell, I have provided the plural apertures, the aperture 68 being of such size as to pass only the intended illuminating rays.

In order that the power of the bulb may not be affected by dust settling thereon, I preferably arrange a conduit 83 to direct a blast from a source of air under pressure on the top of the bulb. The direction of the air blast is that of the direction of travel of the caps so that any portion of the blast passing through aperture 67 will strike the caps to give them additional impetus.

In conjunction with the means for feeding the articles to be counted past a light sensitive cell, the present invention contemplates means for controlling the discharge of the articles to the end that subsequent to the passage of a given number of the articles through one discharge passage, the issuing line may be diverted to another passage.

A branched chute 84 is positioned with its receiving end at the end of the rectilinear chute and with its bottom wall 85 flush with the wall 56. This chute may be supported in any suitable manner and as here shown has supporting means which include a rod 86 in connection with the medial portion of the chute at its upper end and secured at its lower end between a pair of nuts to a bracket 87 fixed to the stand 30. Through adjustment of the nuts the proper relation of the receiving end of the discharge chute to the delivery end of the feed chute may be secured.

At the branch of chute 84 is positioned a gate or flap 88 fixed on an oscillable shaft 89 which is journaled in a bore normal to the trough bottom and piercing upper and lower bosses 90 and 91, Figure 8. Gate 88 is adapted to swing from a position in which it closes the receiving end of chute branch 92 and opens the receiving end of chute branch 93 to a position in which it closes branch 93 and opens branch 92.

Beneath boss 91 an arm 94 is fixed to shaft 98 and at its free end is provided with an obtuse angular notch 94' symmetrical with respect to the longitudinal center line of the arm. A U-shaped frame 95 has its opposite webs provided with polygonal openings adapted to receive a soft iron core 96 for reciprocation therein. The core 96 has a cross section similar to the polygonal openings and is thereby restrained against rotation. Centrally the core is provided with a slot adapted to receive the end of arm 94 and extending transversely of the slot within the notch 94' is a pin 97. Solenoid coils 98 and 99 are supported by the parallel webs of the U-shaped frame 95, within laminated frames 98' and 99', the ends of core 96 being slidable within the coils and the core being reciprocated upon alternate energization of the coils.

Secured to the lower end of shaft 89 is an arm 100 parallel to arm 94 and having fixed to its free end a block 101 of insulating material. Insulated spring switch fingers 102 and 103 fixed to the inner side walls of the U-shaped frame have free ends positioned to be engaged by block 101 at the limits of oscillation of the latter to be alternately moved away from cooperating contact fingers 104 and 105 respectively. Frame 95 is secured to the underside of chute 94 and it and its associated mechanism are housed in a demountable shell 106, Figure 2. In the position of parts shown in Figure 7, fingers 102 and 104 are in contact through suitable contact points while the contact points of fingers 103 and 105 are separated due to the engagement of the former by block 101. A spring-pressed detent 107, Figure 8, cooperates with depressions in a hub portion of gate 88 to yieldingly retain the latter in its limits of oscillation, arms 94 and 100 of course taking the angular position of the gate.

In the position of parts shown in Figure 7, it may be assumed that solenoid 99 has been momentarily energized to move core 96 to the left and pin 97 abutting the left hand wall of recess 94' after a short lost-motion period has swung the arm to the position shown, in which the wall of the notch is in non-overtaking relation to the pin. That is to say, the resultant of the forces acting on the pin upon attempting to swing arm 94 to the right of Figure 7, is in the transverse rather than the longitudinal direction of the core. To reduce friction due to lateral thrusts arising upon co-action of the pin 97 with the notch walls, suitably mounted rollers 108 and 109 are provided, these rollers engaging the side of the core remote from shaft 89 and rotating on axes parallel to said shaft. It will be understood that upon energization of solenoid 98 core 96 will be drawn to the right, Figure 7, swinging the gate in closing relation to branch 93, closing switch 103, 105, and opening switch 102, 104.

Assuming, for example, that it is desired to package the caps in ten gross lots, a receptacle is placed at the delivery end of branch 93. When the count has been completed, gate 88 is caused to oscillate, thereby opening chute 92 to deliver to a receptacle placed at the end of the latter. The output of the apparatus is thus continuous.

The counting apparatus controlled by the passage of the caps between the light source and photo-electric cell, together with the control mechanism for the counting means and the control mechanism for the gate operating means, is shown as a whole in Figures 1 and 2, and in detail in Figures 9 to 17.

The counting mechanism is mounted in a housing 110 having a particularly rigid floor plate 111. Vertically extending posts or stanchions 112, 113, and 114 are fixed to the base plate in longitudinally spaced relation to the latter and aligned longitudinally thereof. In a horizontal aperture adjacent its top, post 113 carries a fixed plug 115' having bearing points 115 and 116. Post 112 has threaded in its upper end a screw 117 co-axial with plug 115' and adapted to be locked in adjusted position by means of the nut 118, the screw presenting a bearing point 119. Post 114 has threaded in its upper end a screw 120 co-axial with screw 117, lockable by means of a nut 121 and presenting a bearing point 122. Bearing points 115 and 119 are engaged in conical recesses in the ends of a shaft 123 and support the latter for free rotation, points 116 and 122 similarly supporting a shaft 124.

Fixed on the end of shaft 123 adjacent point 119 is a ratchet wheel 125 provided with one hundred and forty-four teeth. Four disks or wheels 126, 127, 128, and 129, each having substantially the same diameter as the ratchet wheel, are fixed in co-axial relation to the latter on shaft 123 and spaced from the ratchet wheel and from each other by means of washers as shown, the whole assembly being fixedly clamped together by means of a nut 130. Shaft 124 has similarly mounted thereon a ratchet wheel 131, and five disks or wheels 132 to 136, the ratchet wheel 131, as here shown, being provided with two hundred teeth and consequently being of somewhat greater diameter than ratchet wheel 125, the disks 132 to 136 having substantially the same diameter as ratchet wheel 131. Through means to be hereinafter described, the ratchet wheel 126 is stepped one tooth for each cap which passes between the light openings 67 and 68, which means that upon a complete rotation of the ratchet wheel a gross will have been counted.

Through mechanism to be hereinafter described, ratchet wheel 131 is stepped the space of one tooth upon each complete rotation of ratchet wheel 125. In view of its accumulating function, ratchet wheel 131 may be referred to as an adding wheel and ratchet 125 as a counting wheel. Since ratchet wheel 131 has two hundred teeth, it will be evident that upon a complete rotation thereof, two hundred gross will have been counted. Of course, this wheel might have any other predetermined number of teeth and for that matter, ratchet wheel 125 may be toothed for any preferred count, for example, it might be provided with twelve teeth for counting dozens.

An upright U-shape frame 137 having arms 138 and 139 and a horizontal foot portion 140 is secured through the latter portion to the base plate 111 to one side of shaft 123 and parallel thereto. The arm 137 has an upward extension 141 which carries a pair of spring pawls 142 and 143, engaging the teeth of wheel 125 to prevent retrograde movement thereof. A similar U-shaped frame 144 having arms 145 and 146 and a base flange 147 is similarly arranged relative to shaft 124 and has an upward extension 149 upon which is mounted two spring pawls 150 and 151 cooperating with the teeth of wheel 131 to prevent retrograde movement thereof.

An upright 152 secured to post 113 is provided at its upper portion with a pair of longitudinally spaced elongated slots through which pass screws 153 and 154 to engage a vertical portion 155 of an inverted L-shaped bracket 156, the upright slidably seating in a longitudinal guide groove of the vertical portion 155. The horizontally projecting portion 157 of the member 156 has at its free end a downward extension 158 whose lower surface is in a horizontal plane. A spring steel plate 159 is clamped against the lower surface of the projection 158 by means of spaced plates 160 and 161 and screws as at 162 and 163. Plate 159 projects toward portion 155 of the bracket and has the cross portion of a substantially T-shaped armature 164 secured thereto. The free end of plate 159 is initially somewhat upwardly bent relative to its secured portion but may be brought into substantially uniplanar relation therewith by means of adjusting screws 165 and 166 threaded through tapped bores in the horizontal portion 157 of the bracket, the screws being lockable by means of nuts 167 and 168. The tail of the T-shaped armature member 164 has a screw 169 threaded upwardly therethrough and provided with a lock nut 170, the upper end of the screw engaging the looped end of a steel leaf-spring 171 anchored on top of member 157. Spring 159 tends to lift the armature, this tendency being limited by screws 165 and 166 and assisted to a variable extent, dependent upon the adjustment of screw 169, by spring 171.

A horizontal plate 172 has a vertical portion 173 provided with vertically elongated slots through which are passed screws (not shown) into threaded bores in the lower portion of member 155 to secure the plate to said member for vertical adjustment therewith or relative thereto. Preferably members 155 and 173 are provided with mating vertical ribs and grooves whereby the latter is guided upon adjustment relative to the former. An E-shaped laminated frame 174 is fixed on plate 172 by means of an angle strip 175 so that the ends of the poles are positioned directly beneath and in proximity to the cross portion of the armature 164. The central pole of the laminated frame has an electro-magnetic coil 176 wound thereon, the ends of the coil being brought to the terminals 177 and 178, Figure 9.

One end of the cross member of the armature has a downwardly extending arm 179 secured directly thereto, the horizontally bent lower end of the arm having secured thereto the tail portion 180 of a pawl 181, the tail portion 180 consisting of a strip of spring steel urging the nose portion of the pawl downwardly into engagement with the teeth of ratchet wheel 131.

Plate 172 has a horizontally slotted projection 182 in which is threaded an abutment screw 183 in the swinging path of the lower end of arm 179, the screw being clamped in adjusted position by means of a bolt and nut 184, 185. Vertical member 173 provides a similar seat for an abutment screw 186 at the other side of the arm, the screw 186 being clamped in adjusted position by means of a bolt and nut 187, 188.

A slide 189 adjustable on upright 152 carries a laterally projecting block 190 which extends above the nose of pawl 181 when the latter is at the end of its driving stroke. As may be clearly seen in Figure 10, block 190 has a lower surface mating with the top surface of the pawl when the latter is in projected position. This being the case, the pawl cannot rise, and hence positively locks the ratchet wheel 131 against overriding at the end of each stepping movement.

Plate 172, Figures 9, 10, and 11, has a block 191 secured to its lower surface in substantially parallel relation to shaft 123 and at its end remote from pawl 181 has fixed thereto a U-shaped leaf spring 192 which tends to expand. Secured to the other side of the spring is a plate 193 and separated from the plate and from each other by means of insulating strips are a pair of switch fingers 194 and 195. Finger 194 terminates substantially at the free end of plate 193 and at its end is separated from the latter by means of an insulating pad 196. The free end of finger 195 extends into the swinging path of the pawl tail 180 to be struck by an insulating block 197 secured to the end of the latter, fingers 194 and 195 being provided with switch points normally in contact but separated each time block 197 hits the end of finger 195. An adjusting screw 198 is passed freely through an aperture in plate 193 and is screwed in a tapped bore in block 191, spring 192 constantly holding the plate against the head of the screw. As may be seen from Figure 9, the head of screw 198 is accessible so that the screw may be adjusted during the operation of the machine.

An exactly similar driving arrangement is provided for ratchet wheel 125, the magnet core being designated at 199, Figure 9, the armature at 200, the armature arm at 201, the driving pawl at 125′, and the outer switch arm at 202. (See also Fig. 18).

The described electro-magnetically operated driving means for the ratchet wheels is of great importance in the accurate operation of the apparatus, and is constructed for minute adjustment so that the proper throw is imparted to the driving pawls and an intermittent movement of the ratchet wheels secured. Plates 159 have considerable spring strength and tend to lift the armature away from the magnet poles. Proper air space between the poles of the armature is secured through adjustment of screws 165 and 166, and it will be recalled that the poles may be adjusted upwardly relative to the armature since they are supported on plate 172. Spring 171 acts as an auxiliary to plate 159, and delicate adjustment may be secured through screw 169. The vibration of the lower end of arm 179 is controlled through adjustment of the abutment screws 183 and 186, and it may be mentioned here that due to the length of arm 179 its lower end swings a relatively great distance upon a minute movement of the armature. Further, it will be recalled that the entire bracket 156 may be adjusted on upright 152 to secure the proper relation of pawl 181 to ratchet wheel 131, and block 190 is adjustable to accommodate adjustments of the bracket.

It will be noted that the teeth of ratchet wheel 131, Figure 10, have a gradually sloped leading edge and an abrupt trailing edge. As pawl 181 is retracted upon energization of the magnet coil 176, its nose snaps downwardly on the relatively gradual slope of the succeeding tooth so that the flat undersurface of the pawl rests substantially flat on the tooth, or at least so that a very minute angular space exists. Due to this tangentially elongated contact area between the pawl and the tooth, the pawl, under the force of its spring, exerts a considerable drag on the wheel so that overriding of the wheel under the impact of the pawl is prevented. The pawl thus acts as an inertia damper. Also, the pawl in snapping on to the succeeding tooth exerts an appreciable pressure on the ratchet wheel in the opposite direction to its normal direction of rotation, so that exactly uniform intermittent advance of the wheel is assured even at very high speeds.

The feeding pawls are retracted by their electro-magnets and upon deenergization of the latter are advanced under the considerable force of their main and auxiliary springs. Consequently, unless the magnets are energized, the noses of the pawls are firmly held at the ends of their advance strokes under the locking blocks so that accidental movement of the ratchet wheels is prevented. Upon each energization of the magnets, switch fingers 195 and 202 are moved to interrupt the circuits in which they are connected, and consequently these fingers will be referred to hereinafter as "interrupters". In the reset operation to be later described, the interrupters are connected in circuits with electromagnets 176 and 199, respectively. When counting, interrupter 202 is in a detector lamp circuit, interrupter 195 being without effect at this time.

Referring to Figures 9 and 10, a horizontal shaft 203 is supported between the arms 145 and 146 of member 144 in parallel relation to shaft 124. Mounted on shaft 203 and spaced for cooperation with disks or wheels 132 to 136 are the feelers 204 to 208, these feelers being independently oscillable on the shaft. At its upper end each feeler has an angular nose as at 204′, Figure 10, adapted to enter a notch or notches on its associated disk, one notch being shown at 132′, Figure 10. Each feeler at its lower end has secured thereto a downwardly extending spring contact finger as at 209, Figure 10, the remaining fingers being shown at 210 to 213, Figure 12. The fingers at their lower ends have contact points for cooperation with points on strips 214 to 218 mounted on a strip of insulation and secured to the back of member 144 just above base plate 111. Feeler 204 is provided with another downwardly extending and insulated spring contact finger 219 provided at its lower end with a contact point positioned to cooperate with a point at one end of a horizontally extending spring finger 220 secured at its other end through the insulating strip to frame 144.

Disk 132 is provided with the single notch 132′. Disk 133 is also provided with a single notch in the same angular position as the notch of disk 132, see Figure 18. Disk 134 has two diametrically opposed notches, disk 135 has four equally spaced notches, and disk 136 has twenty equally spaced notches. This being the case, the noses of feelers 204 and 205 will fall into the notches of their associated disks once for each complete revolution of ratchet wheel 131, and when this occurs, switches 209 and 210 will be closed and switch 219 opened. Similarly, feeler 206 will cause the switch 211 to close twice during each complete revolution of wheel 132. Switch 212 will be closed four times, and switch 213 will be closed twenty times during the same period. In other words, the ratchet wheel 131 must be stepped completely around to close switches 209 and 210 and to open switch 219. Switch 211 is closed each time the ratchet wheel is stepped the space of one hundred teeth, switch 212 is closed each time the ratchet wheel is stepped the space of fifty teeth, and switch 213 is closed each time the ratchet wheel is stepped the space of ten teeth. The noses of the feelers are held in engagement with their associated disks by means of leaf springs 221 to 225, these being fixed at the lower ends to the outer face of member 144.

Similarly designed and mounted feelers 226 to 229 are arranged for cooperation with disks 126 to 129, see particularly the diagrammatic showing of Figure 18. The feeler 226 controls the two switch arms 230 and 231 which cooperate with contact strips 232 and 233 in exactly the same manner as above described with reference to fingers 209, 219. Feelers 227 to 229 control switch fingers 234 to 236 which cooperate with strips 237 to 239 in exactly the same manner as described with reference, for example, to switch 210. Disk 126 is provided with a notch 126' denoting its zero position. Disk 127 is provided with a somewhat elongated notch 127' set in advance of notch 126' substantially the space of twelve teeth of the ratchet wheel 125. Disk 128 is provided with a notch 128' angularly arranged as notch 126', and disk 129 is provided with a similarly disposed somewhat more elongated notch 129'.

Mounted on a horizontal portion of a bracket 240 secured beneath the top wall of box 110 is an electro-magnet 241. In ears 242 and 243 provided on a bracket is mounted a horizontal shaft 244 to one side of the magnet pole. An armature 245 arranged directly above the pole of the magnet has integral bearing lugs 246 and 247 oscillably mounted on shaft 244 and guided by the ears 242 and 243. Integral with lug 247 is a downwardly extending arm 248 to the lower end of which is fixed a spring steel strip 249 which at its free end has fixed thereto a pawl finger 250 which projects back beyond the lower end of arm 248. A horizontal plate 251 fixed to the horizontal portion of the bracket 240 carries a downwardly projecting block 252 having the parallel leg portions 253 and 254. Journaled in these leg portions transversely to the plane of the swing of arm 248 is a shaft 255 on which is fixed between said portions a ratchet wheel 256 and a spacing collar 257, the ratchet wheel being positioned to be driven by pawl 250. A spring pawl 256' locks the ratchet wheel against retrograde movement. A locking block 258, similar to those already described, is fixed to the lower end of leg portion 254 for cooperation with the pawl nose. Fixed on shaft 255 outwardly of leg portion 253 is a switch wheel 259 of conductive material provided with peripheral non-conductive inserts 260, Figure 9, the side of the wheel adjacent its center presenting a continuous conductive ring in connection with the conductive peripheral portions of the wheel. To the lower surface of a block 261 fixed beneath plate 251 and extending above the switch wheel are secured a pair of insulated brackets 262 and 263, each bracket presenting an angular lug, and the lugs supporting pins 264 and 265 in parallel relation to the shaft 255. Wipers 266 and 267 are swingably mounted on the pins, and by means of torsion springs 268 and 269 have their free ends urged against the periphery of the switch wheel, the arrangement being such that one wiper rests on a conductive segmental portion of the wheel periphery while the other rests on a non-conductive segment. The driving stroke of pawl 250 is such that each stepping movement of the ratchet wheel imparts an angular advance to the switch wheel to reverse the relation of the wipers to the peripheral segments of the wheel so that one wiper always rests on a conductive segment and the other on a non-conductive segment. A bracket 270 secured to one side of block 261 provides a lug 271 supporting a pin 272 upon which is mounted a third wiper 273 whose free end is urged against the conductive face of wheel 259 by a torsion spring 274, Figure 9.

Upon energization of electro-magnet 241, pawl 250 is retracted, and upon deenergization of the magnet the pawl is advanced by means of a tension spring 275 connected between bracket 240 and arm 248, Figure 13, and the ratchet wheel stepped the space of one tooth. The working stroke of the pawl is determined by an adjustable abutment screw 275'.

The three wipers are mutually insulated as to their mounting, but it will be evident that wiper 273 will always be in electrical connection with one or the other of wipers 266 and 267 through the switch wheel.

Referring particularly to Figures 9 and 15, a bracket 276 suitably positioned and supported in box 110, has a horizontal portion 277, to the lower surface of which is secured an electro-magnet 278. The bracket provides side walls as at 279, Figure 15, supporting a horizontal shaft 280 somewhat below and to the side of magnet 278, an armature 281 being oscillable about shaft 280 to oscillate an arm 282, the arrangement being substantially that described in connection with Figure 13. A further horizontal portion 283 of bracket 276 supports a counter 284, of commercial type, and here shown as a Veeder counter. Upon energization of electro-magnet 278, the upper end of arm 282 strikes a crank pin 285 of the counter to actuate the latter. The crank pin, upon deenergization of magnet 278, is returned by means of a spring within the counter, and also returns arm 282 a distance determined by the adjustable abutment screw 286.

The notched disks 133 to 136, above described, control, through their associated switches, circuits which in turn control the operation of gate 88 at predetermined intervals. As has been discussed, the switch 213, for example, controlled by disk 136, is actuated to close a circuit upon each ten steps of the disk. Since each step of the disk is dependent upon a full rotation of counting wheel 126, it will be evident that switch 213 will be closed upon each count of ten gross. Switch 212 will be closed upon each count of fifty gross, switch 211 upon each count of one hundred gross, and switch 219 upon each count of two hundred gross. In order that the gate operating solenoids may be energized in dependence upon the closing of any one of the switches 210 to 213, selecting mechanism operated by the push buttons 287 to 290 is provided. Reset mechanism is also provided which is controlled by the push button 291. These buttons operate directly on switches particularly shown in Figures 9, 15, 16, and 18. Push button 288 is shown in detail in Figure 15 and buttons 287, 289, and 290 are exactly similar thereto, button 291 being slightly different in form but similarly mounted.

Referring to Figure 15, it will be seen that button 288 is superposed on a shank comprising cylindrical portion 292 which is reciprocable in a collared opening in the block 293 which constitutes a portion of the top wall of box 110. The cylindrical portion 292 is provided with an elongated longitudinally extending recess 292' in which projects a pin 294 fixed in inwardly extending radial relation in the guide collar, the pin serving to limit the reciprocatory movements of the cylindrical plunger portion and to prevent its rotation. Beneath portion 292 is a restricted cylindrical portion 295 having a circumferential recess 296 while below this is a conically tapered portion 297 terminating downwardly in a cylindrical tip 298. Referring to Figure 16, wherein the buttons are assumed to be in their upper position, it will be noted their lower tips lie between the ends of pairs of spring contact fingers, these being designated at 299, 300; 301, 302; 303, 304; and 305, 306, the other ends of the pairs of fingers being secured to insulating blocks 307 to 310. Extending alongside of fingers 299, 301, 303 and 305, and insulated therefrom, are contact strips 311 to 314. Upon depression of the button 288, for example, fingers 301 and 302 will be spread by the conical portion 297 to form a contact between the points of finger 301 and strip 312. As the conical portion 297 passes beyond the finger ends, the recess 296 will be engaged by longitudinal ribs at the finger ends so that button 288 will be held in depressed position with the switch 301 closed. The operation of the other buttons 287, 289, and 290 is the same as that of button 288.

Button 291 is spaced to one side of the line of buttons 287 to 290 in symmetrical relation thereto and is of substantially the same form as button 288, omitting recess 296 of the latter. Referring to Figure 16, the lower tip of the button extends between two spring switch fingers 315 and 316, the latter carrying outwardly projecting insulating blocks 317 and 318 respectively and having their other ends clamped in insulated relation in an anchoring member 319. Reference numerals 320 and 321 designate further spring fingers whose free ends project into position to be engaged by blocks 317 and 318, while a further spring finger 322 supports an insulating block 322' adapted to be engaged by the end of finger 320.

Contact strips 323 and 324 project between fingers 315 and 316 adjacent the respective fingers, and have contact points normally in contact with points on the switch fingers. Outwardly of fingers 315 and 316 are disposed contact strips 325 and 326 having contact points normally out of contact with points provided on the fingers. Contact strips 327 and 328 have contact points normally engaged by contact points on fingers 320 and 321 respectively. Contact strips 329 and 330 have points adapted to be engaged by points on fingers 320 and 321, but normally out of contact therewith. Finally, a contact strip 331 has a contact point normally engaged by a contact point on finger 322.

When button 291 is depressed its conical portion will spread fingers 315 and 316, the movement of finger 315 being transmitted to fingers 320 and 322 through the blocks 317 and 322', while movement of finger 316 is transmitted to finger 321 through block 318. Thus fingers 315 and 316 will be moved out of contact with strips 323 and 324 and into contact with strips 325 and 326. Fingers 320 and 321 will be moved out of contact with strips 327 and 328 and into contact with strips 329 and 330. Finally, the contact between finger 322 and strip 331 will be broken. The illustrated position of the multiple switch is its normal position, while the position just described is its reset position. Button 291 normally takes the upper position shown in Figure 15 and must be held depressed by the operator when resetting.

I have provided means whereby one of the control buttons being depressed, the others are locked in their upper positions. Referring particularly to Figures 15 and 16, a pair of arms, of which one is shown at 332, Figure 15, support a rock shaft 333 upon which are fixed four two-armed levers 334 to 337 immediately in front of the lower ends of the button shanks. Lever 335 is clearly shown in Figure 15 and the remaining levers have the same form.

The lever 335 comprises a nose portion adapted to be struck by the conical portion of the button shank upon depression of the latter to rock the lever. Fixed to the tail of the lever is a leaf spring 335' which is bent around and connected to a slide 335'' movable toward and away from the button shank in guides provided beneath plate 293 as shown in Figure 17. Lever 334 is connected through a spring 338 to an independent slide 339 and levers 336 and 337 are connected through springs 340 and 341 to slides 342 and 343. With all of the buttons 287 to 290 in their upper position the slides and levers are in the position shown in Figure 15. Assuming button 287 to be depressed, the conical portion of its shank will strike the nose of lever 334 and thereby rock shaft 333, causing the slides to move toward their associated button shanks. Slide 339, however, abuts the upper cylindrical portion of the button shank and merely bears thereagainst yieldingly without preventing further depression of the button. Slide 337, however, will move against shank portion 295 and under the shoulder between this portion and the superposed portion 292 so that button 288 cannot be depressed, and slides 342 and 343 will similarly prevent depression of buttons 289 and 290. A yoke 344 pivoted on shaft 333 has its cross portion 345 underlying button 291 and on the opposite side of shaft 333 carries a plate 346 underlying the lower tips of buttons 287 to 290. Portion 345 overbalances plate 346 so that the position of the yoke is normally that shown in Figure 15. The lower end of the shank of button 287 in moving downwardly has struck plate 346 to swing the yoke in a counter-clockwise direction about shaft 333, thereby bringing portion 345 substantially in contact with the lower end of the shank of button 291. If button 291 is depressed for resetting, it will be seen that through the intermediary of the yoke, button 287 will be returned to its upper position. Similarly, button 291 cannot be held depressed while one of the buttons 287 to 290 is being depressed. Moreover, in resetting, button 291 must be held in its lower position, since fingers 315 and 316 engaging the conical portion of the button shank tend to return it upwardly.

All of the devices of the counting mechanism heretofore described are diagrammatically shown in assembled relation in Figure 18, together with their operating circuits. Referring to this figure, reference numeral 347 designates a multiple jack having cooperating contacts and plugs 348, 349; 350, 351; 352, 353; 354, 355; 356, 357; 358, 359; 360, 361; 362, 363; 364, 365 and 366, 367.

The amplified current from the photo-cell is in connection with plugs 365 and 367 and when the latter are inserted in contacts 364 and 366, a circuit is adapted to be completed from contact 364 through conductor 368, contact strip 323, switch finger 315, conductor 369, magnet coil 199, milliammeter 370, conductor 371, switch finger 320, contact strip 327 and conductor 372 back to contact 366. Thus electro-magnet 199 with the reset switch set for normal operation as in Figure 18, is adapted to be intermittently energized in dependence upon the rate of feed of the caps between bulb 74 and photo-electric cell 78. At each energization the actuating pawl for wheel 125 is retracted and upon each deenergization the pawl is projected whereby the wheel is advanced one step and carries wheels 126 to 129 with it.

Plugs 357 and 359 are in connection with a source of 110 volt A. C. and upon insertion in contacts 356 and 358, a circuit may be traced from the latter as follows: conductor 373 (in connection with contact 356), jack 374, conductor 375, and branches 376 and 377 to the coils 98 and 99; conductor 378 (in connection with contact 358), wiper 273, switch wheel 259, wiper 266, conductor 379, jack 374, and contact strip 105. Switch 103, as shown in Figure 18, is open, this finger being connected through a conductor 380 with the other end of coil 99. If the relation of wipers 266 and 267 is reversed to the conductive and non-conductive segments of wheel 259, a circuit is completed through the wheel, wiper 267, conductor 381, switch finger 102, contact strip 104 and conductor 382 to the other end of coil 98, causing energization of the latter with consequent swinging of arm 100 and gate 88 and opening of switch 102, switch 103 being closed in order to effect energization of coil 99 upon the next step of wheel 259. Condensers 383 and 384 are associated with the switches 102 and 103 and are housed in a shell 385, Figure 2.

A sixty milliampere circuit is connected up to plugs 361 and 363 and upon insertion of the latter in contacts 360 and 362, current is made available for the energization of electro-magnets 176, 241, and 278. A conductor 386 leads from contact 362 to contact strip 239 which cooperates with switch 236. In Figure 18 wheel 125 is considered to have been stepped a few notches from its zero position so that the nose of feeler 229 rests on a full peripheral portion of disk 129 and switch 236 is open. A branch 387 leads from conductor 386 to the contact strip 237 of switch 234 which is likewise open. As counting wheel 125 approaches its zero position the nose of feeler 227 will drop into notch 127' closing switch 234 and connecting branch 387 with a conductor 388 which is in connection with spring finger 322 of the reset switch. From this point a circuit is completed through contact strip 331, conductor 389, electro-magnet 278 and conductor 390 back to contact 366. A branch 391 in connection with conductor 388 leads through contact strip 324 and switch finger 316 of the reset switch, a conductor 392, electro-magnet 176, conductors 393, and 394, back to contact 360. Coils 176 and 278 are thus energized, the former retracting pawl 181 and the latter actuating the Veeder counter. The nose of feeler 227 now passes out of notch 127' opening switch 234 and thus deenergizing coils 176 and 278 so that adding wheel 133 is stepped ahead one notch to a position, let it be assumed, wherein the feelers 204 to 208 all fall in notches of their associated disks. Let it be further assumed that button 290 is depressed, closing switch 305 for counting ten gross lots. Upon continued stepping of the counting wheel the nose of feeler 229 falls into notch 129', closing switch 236, and hereupon a circuit is completed to a conductor 395 which is in connection with a line 396 leading to switch fingers 210 to 213, which latter are closed and complete circuits to conductors 397, 398, 399, and 400. Conductor 400 leads to switch finger 305 and button 290 being depressed, the latter is in contact with strip 314 which through a conductor 401 is in connection with one end of coil 241, the other end of the coil being in connection with lead 394. Coil 241 is thus energized and pawl 250 retracted. As the nose of feeler 229 passes out of notch 129' (which indicates that the counting wheel has reached zero position), switch 236 is opened and coil 241 deenergized, whereupon wheel 259 is stepped to switch the control gate. The control gate is thus moved the instant a given gross count is completed, assuring absolutely accurate count. Conductors 397, 398, and 399 lead respectively to switch fingers 299, 301, and 303, and are adapted to close circuits to conductor 401 upon depression of the respective buttons 287, 288, and 289 to count two hundred, one hundred, or fifty gross losts respectively.

As has been described, the Veeder counter is actuated upon the completion of each count of one gross and thus indicates the total count in gross. If, for example, an order for one hundred ten gross packages is being counted, it is not necessary for count to be kept of the packages, since the attendant will know that the order is complete when the counter registers "1000". The counter need not be reset after the completion of each order, but may be utilized to indicate the day's production, etc., and thus provides a constantly available check on output.

A 6 volt circuit is in connection with plugs 353 and 355, and when the latter are engaged in contacts 352 and 354, current is made available for bulb 74, a counting indicator bulb 402 and a zeroizing indicator bulb 403. A conductor 404 leads from contact 352 to switch finger 321 of the reset switch. Finger 321 is in contact with strip 328 and the latter is connected through a conductor 405 to the interrupter 202. From the interrupter a conductor 406 leads to bulb 402 and thence a conductor 407 leads back to contact 354. Interrupter 202 is actuated upon each energization of coil 199 to interrupt the lamp circuit. Consequently consistent flashing of lamp 402 indicates that the counting apparatus is operating properly.

Leading from conductor 404 adjacent contact 352 is a conductor 408 which leads through a jack 409 to bulb 74, return being effected through a conductor 410 to conductor 407 adjacent contact 354.

Assuming that the apparatus has been set for counting ten gross lots, and it is desired to change to fifty gross lots, the reset or zeroizing button 291 is depressed, thus changing the connections at the reset switch and returning the ten gross button to its upper position and opening switch 305. It is now necessary to connect coils 199 and 176 into the sixty milliampere circuit through interrupters 202 and 195 to return the associated disks to their zero positions. Counting wheel 125 is first returned to zero, whereupon adding wheel 133 is returned, illuminating current thereupon being supplied to bulb 403. Upon depressing button 291, finger 316 is placed in contact with strip 326 and finger 321 in contact with strip 330. Fingers 315 and 320 are placed in contact with strips 325 and 329 and finger 322 is moved out of contact with strip 331 to interrupt the circuit to coil 278. A circuit is completed from contact 362 through conductors 386, 387 and a branch 411 to interrupter 202. A conductor 412 leads from the interrupter to strip 233 and thence through spring finger 231 and a conductor 413 to contact strip 325 of the reset switch which is in contact with finger 315. The latter is in connection with conductor 369 which leads to coil 199. Conductor 371 is now in connection wih contact strip 329 through finger 320 of the reset switch, the contact strip being in connection through a conductor 414, conductor 394 and terminal contact 360. The coil circuit is intermittently completed through interrupter 202 until disk 126 reaches its zero position whereupon switch 231 opens and switches 230 and 235 close. Coil 176 is thus placed in the sixty milliampere circuit through a conductor 415, interrupter 195, conductor 416, switch 219 ( which is assumed to be closed), conductor 417, switch 235, conductor 418, contact strip 326, of the reset switch, switch finger 316, and conductors 392, 393, and 394. The adding wheel is now stepped to zero position whereupon the nose of feeler 204 falls into the notch 132', thus causing switch 219 to open, cutting out the coil circuit, and switch 209 to close. Hereupon a 6 volt circuit is completed to bulb 403 through conductor 407, a branch 419, conductor 420, switch 209, conductor 421, switch 230, conductor 422, contact strip 330 of the reset switch, spring finger 321 and conductor 404. Due to the interposition of switches 230 and 209 in the circuit to bulb 403, illumination of the latter denotes that both the counting and adding wheels have been stepped to their zero positions.

Referring to Figures 1 and 4, it will be seen that the space of about four caps exists between light aperture 67 and the arc of swing of the end of gate 88. Consequently when the gate is swung, about four caps at the end of the count will be diverted into the next lot. Accordingly when starting the machine, four caps should be placed in the first receptacle to be filled. Thereafter the count will be accurate since the last four counted in each lot will be transferred to the succeeding lot.

The various electrical devices have varied current requirements, as has been described. I have shown in Figure 19 a compact arrangement for effecting appropriate distribution from a 110 volt A. C. source of supply, this figure also showing a suitable amplifying system for the photo-electric cell impulses.

Referring to Figure 19, reference numerals 423, 424 designate terminals of a jack for connection in a 110 volt A. C. supply cable 465, Figures 1 and 2. A conductor 425 leads from terminal 423 to one end of the adjustable primary coil 426 of an iron core transformer whose core is designated at 427.

A branch 428 from conductor 425 leads to the plug 359 of the multiple jack 347. A line 429 leads from terminal 424 to terminal 351 of the multiple jack, the latter terminal being positioned to engage contact 350. A conductor 430 and a master switch 431, Figure 18, complete the circuit between contacts 350 and 348, which latter is engaged by plug 349 of the multiple jack. Plug 349 is in connection with a line 432 leading to the other side of the primary winding 426 and through a branch 433, with plug 357 of the multiple jack which engages contact 356, Figure 18. With the master switch closed and terminals 423 and 424 plugged into the supply line, it is evident that the primary winding will be energized and current also made available for the gate operating solenoids.

The secondary coil of the transformer includes series of turns 434 to 444 demarked by tappings into the coil. The turns 434 are in connection with plugs 355 and 353 of the multiple jack through conductors 445 and 446, plugs 355 and 353 being adapted to engage contacts 354 and 352, Figure 18, of the lamp circuits, the turns 434 being of such number as to supply a 6 volt current for the lamps 74, 402, and 403.

Turns 435 to 437 are in connection with the elements of a 280 full wave rectifier tube 447 and turns 439 to 441 are in connection with the elements of a 280 tube 448. Tubes 447 and 448 are connected in an amplifying circuit including a 227 detector tube 449 and two 245 amplifier tubes 450 and 451, the filament circuit of the tubes being in connection with the turns 438. Conductors 452 and 453 of the amplifying circuit lead from plugs 454 and 455 of a jack 460, Figure 18, and are respectively connected into the grid 456 and electron emitting element 457 of the detector tube. Plugs 454 and 455 are engageable with contacts 461 and 462 of jack 460, the contacts 461 and 462 being in connection respectively, with the anode 80 and cathode 79 of the photo-electric cell 78 through conductors 463 and 464. The leads 458 and 459 from the amplifying circuit are in connection with plugs 365 and 367 of the multiple jack. The arrangement of the amplifying circuit is such and the grid bias so controlled as to provide a reverse circuit, that is, a circuit operating "on the dark" so that electro-magnet 199 will be energized each time a cap comes over light aperture 67.

A 280 tube 466 has its elements in connection with turns 442 to 444 and is in connection with plugs 363 and 361 of the multiple jack through conductors 467 and 468, for supplying a 60 milliampere current through contacts 362 and 360, for electro-magnets 176, 278, and 241, and also for electro-magnet 199 when resetting. All of the apparatus just described is supported in a box 469 beneath box 110, as shown in Figure 2.

The apparatus shown in Figures 20 to 25 is a modification of that already described only insofar as the counting mechanism proper is concerned and may be substituted for the box 110, retaining, however, the switch wheel 259, magnet 241 and associated mechanism, of the latter.

In Figures 20 to 23, reference numeral 470 designates a housing comprising a rigid floor plate 471 upon which are mounted pedestals 472 and 473 which carry ball bearing units for the rotative support of a horizontal shaft 474. Adjacent pedestal 472 a ratchet wheel 475 is fixed on shaft 474, the ratchet wheel having one hundred and forty-four teeth. An upright 476 fixed to the base plate supports a horizontally disposed electro-magnet 477 with its pole parallel to a tangent to the ratchet wheel. A horizontal bar 478 secured at one end to the upright supports a pendent arm 479 on a bolt 480 at its other end. Fixed on arm 479 is an armature plate 481 for cooperation with the electro-magnet. At its lower end arm 479 carries a pivoted spring-pressed pawl 482 for cooperation with the teeth of ratchet wheel 475. A finger 483 fixed to arm 479 and projecting thereabove has one end of a tension spring 484 connected thereto. The other end of the spring is connected to a pin 485 which has a threaded shank passed through an aperture in the upper end of upright 476 and secured in adjusted position by means of nuts 486 and 487. The action of spring 484 is limited by an adjustable abutment screw 488 threaded in an ear 489 offset from a wall of the housing and lockable relative thereto by means of a nut 490. Upon energization, electro-magnet 477 attracts the armature and imparts a driving stroke to pawl 482 to step the ratchet wheel the space of one tooth, the return movement of the pawl being effected by spring 484 as will be understood. The electro-magnet is intended to be affected by the amplified photo-electric cell current. The amplifying circuit may be the same as is shown in Figure 19, the electro-magnet then being connected in circuit with contacts 454 and 455.

Fixed on shaft 474 adjacent wheel 475 is a switch wheel 491 of conductive material, the periphery of the wheel being interrupted by non-conductive inserts so that one hundred and forty-four peripheral conductive segments are presented. A pivoted spring-pressed wiper 492 engages one of the conductive faces of the wheel, and a similar wiper 493 engages its periphery. The wipers are connected in a lamp circuit so that the circuit is completed and a signal given each time wheel 475 is stepped.

Adjacent wheel 491 a brake disk 494 is fixed to shaft 474. A rigid yoke 495 is pivoted at one end to a short pedestal 496 and extends beneath disk 494 to be yieldingly supported at its other end on a compression spring 497 surrounding a screw 498 supported on the base plate and extending upwardly through an aperture in the yoke end. The lower end of the spring is seated on a vertically adjustable nut 499 so that the force of the spring may be controlled. Beneath disk 494 the yoke carries a pad 500 of friction material which engages the lower peripheral portion of the disk to steady shaft 474 and particularly to prevent retrograde movement of the ratchet wheel. The central portion of the yoke and lower disk portion project into an oil bath 501 to insure smooth action of the friction pad.

Intermediate disk 494 and pedestal 473, shaft 474 is formed as a worm 502 engaging a worm ring 503 rotatable about the axis of a shaft 504 which is journaled in bearing portions of uprights 505 and 506. The worm ring is rotatably mounted on the circular rim 507 of a wheel 508 fixed on shaft 504 and at one side seats against a peripheral shoulder 509 of the rim. A circular plate 510 has a central aperture receiving the elongated hub 511 of wheel 508 and with its outer marginal portion bears frictionally against the other side of the worm ring, being urged thereagainst by a spiral compression spring 512 engaged between the plate and a collar 513 integral with shaft 504. A sleeve 514 integral with plate 510 houses spring 512, the outer surface of the sleeve being knurled.

An axially extending pin 515 fixed in rim 507 projects in an aperture formed in plate 510.

Fixed to the opposite side of rim 507 from plate 510 is a ring 516 provided with ten equally spaced axially projecting lugs 517 to 526. Lugs 518 to 521 and 523 to 526 project equally from the ring. Of the diametrically opposite lugs 517 and 522, the latter has a greater projection than the groups of lugs 518 to 521 and 523 to 526, while lug 517 has a greater projection than lug 522.

A slide 527 is guided for movement in the axial direction of shaft 504 over an aperture 528 in the top of casing 470 on ledges 529 and 530, being retained on the latter by the overlying margins of strips 531 and 532. The slide has an integral vertical tubular portion 533 whose bore is extended through the slide. An insulating bushing 534 fits within the bore and has its lower end expanded to engage under a circumferential shoulder 533' in the lower end of the bore. A conductor pin 535 extends axially of the bore and has an enlarged contact foot 536 which has a sliding fit in the bushing 534 and is normally substantially flush with the bottom of the latter. The upper end of pin 535 is guided in a bore in a plug 537 fixed in the upper end of the bushing, the projecting end of the pin having a conductor terminal 538 in connection therewith and held down by a nut 539.

An angle lever 540 is pivoted to slide 527 therebeneath on an axis parallel to the axis of shaft 504. The upper arm of the lever carries an insulated contact member 541 for cooperation with contact member 536. The lower lever arm rotatably supports a wheel 542 adapted to be engaged by the lugs 517 to 526 to move contact member 541 into momentary engagement with contact member 536, the latter being adapted to yield upwardly, if necessary, against the force of a compression spring 546 interposed between it and plug 537. A headed screw 543 is passed upwardly through an aperture in the free end of the lower lever arm and engaged in a tapped bore in the underside of slide 527 and is lockable in adjusted position by means of a nut 544. The head of the screw limits downward movement of the lever arm, a compression spring 545 surrounding the screw between the arm and the slide and tending to hold the arm against the screw head.

The purpose of slide 527 is to enable the switch operator 540 to be disposed for engagement by all of lugs 517 to 526, by lugs 517 and 522 only, or by lug 517 alone, the three positions being indicated by the three angular notches 547, 548, and 549 in the side of strip 531. A bolt 550 is slidable in a recess 551 in the top of the slide radial to tubular member 533 and perpendicular to the line of movement of the slide, the bolt having an angular nose 552 positioned for cooperation with the notches 547 to 549. A collar 553 rotatable about tubular portion 533 has on its lower face an eccentric cam groove 554 in which is engaged a stud 555 projecting from the top of bolt 550. Rotation of the collar serves to project and retract the bolt, the lower edge of the collar adjacent the groove being recessed as at 556 to clear the nose 552 when the bolt is retracted. If the point of the nose is within the limits of a notch, projection of the bolt will result in a camming action between the nose and a wall of the notch to move the slide into exact position. The collar 553 is provided with an inner circumferential recess 553' in which is housed a torsion spring 557 anchored at one end to a pin 558 on the collar and at the other end to a pin 559 on an annular cover plate 560 fixed to tubular member 533, the margin of plate 560 overlying the upper end of the collar to prevent upward displacement of the latter. The tendency of the torsion spring is to hold bolt 550 in projected position. The collar has a reduced threaded upper portion on which is threaded a cap 561.

Worm ring 503 makes one complete revolution in the direction of the arrows for each one hundred revolutions of ratchet 491. If the switch operator is set for cooperation with all of the lugs, it follows contact members 536 and 541 will be closed upon each count of ten gross and close a circuit to magnet 241 which controls the discharge gate operation. It will be understood that contact elements 536 and 541 are interposed in a simple supply circuit for electromagnet 241, and a supply circuit for electromagnets 98 and 99 may be arranged substantially as shown in Figure 18. In its other positions the operator will close the contacts upon counts of fifty and one hundred gross respectively. In order to indicate the unit count an extension 562 of shaft 474 carries a pointer 563 which cooperates with a dial 564 provided with one hundred and forty-four circular graduations.

In Figure 21 the lug ring 516 is shown in zero position. To reset the ring to this position it is only necessary to depress a spring retracted plunger 565 and rotate plate 510 through sleeve 514 in a direction counter to the arrows, Figure 21, until an abutment block 566 on rim 507 strikes the foot of the plunger. During this operation rim 507 and plate 510 slide relative to the worm ring which is locked by the worm. The clutch action is such, however, that rotation of the worm ring will always be fully imparted to the lug ring 516.

It will be understood that many modifications and variations are possible without departure from my invention as above disclosed with reference to illustrative embodiments. Accordingly I do not limit myself except as in the following claims.

I claim:

1. Apparatus for counting articles, said articles being so shaped as to be fed in a line in mutually contacting relation with the contact area between contiguous articles of a dimension transversely of the line less than the transverse dimension of the articles so that aligned spaces exist between the articles in the line, said apparatus comprising means for feeding and guiding the articles in the prescribed relation, a light-sensitive cell and a source of light, a circuit in which said cell is connected, the cell and source being arranged relative to the line of articles so that the former is intermittently illumined by the latter through the spaces between the articles and the circuit intermittently energized, counting mechanism and translating means in connection with the circuit for intermittently actuating the counting mechanism.

2. Apparatus for counting articles, said articles being so shaped as to be fed in a line in mutually contacting relation with the contact area between contiguous articles of a dimension transversely of the line less than the transverse dimension of the articles so that aligned spaces exist between the articles in the line, said apparatus comprising a light-sensitive cell, a source of light, a circuit in which said cell is connected, a chute, means for feeding a line of articles along said chute in the prescribed relation, said chute having a wall provided with an aperture positioned to pass light from the source to the cell, said aperture being alternately obstructed by the articles and freed by the spaces between the articles whereby the circuit is intermittently energized, counting mechanism, and translating mechanism in connection with the circuit for intermittently actuating the counting mechanism.

3. Apparatus for counting substantially circular articles, said apparatus comprising means for feeding and guiding the articles in a line in substantially diametrically contacting relation, a source of light, means for directing a beam from the source across and within the path of travel of the articles and to the side of their line of contact whereby the beam is interrupted by each article, a light-sensitive cell in the path of the beam and intermittently sensitized thereby, a circuit for the cell, counting mechanism, and translating means in connection with the circuit for operating the counting mechanism.

4. Apparatus for counting substantially circular articles, said apparatus comprising a chute comprising a bottom wall and side walls, means for feeding the articles along said bottom wall and between the side walls in substantially diametrically contacting relation with each other said bottom wall being provided with an aperture between the line of contact of the articles and one of the side walls, a source of light and a light-sensitive cell on opposite sides of said aperture, a circuit for said cell, said articles, alternately obstructing and freeing said aperture in their passage thereover whereby the cell is intermittently sensitized and the circuit energized, counting mechanism, and translating means in connection with the circuit for operating the counting mechanism.

5. In apparatus for counting substantially circular articles, a chute having a bottom wall for supporting the articles for travel therealong with the articles in guided substantially diametrically contacting relation with each other, said bottom wall having an aperture to one side of the line of contact of the articles, and a light source and a light-sensitive cell positioned at opposite sides of said aperture.

6. In apparatus for counting substantially circular articles, a chute having a bottom wall for supporting the articles for travel therealong with the articles in guided substantially diametrically contacting relation with each other, said bottom wall having an aperture to one side of the line of contact of the articles, a cover for said chute having an aperture registering with the aperture of the bottom wall, said cover being so spaced relative to said bottom wall as to prevent superposition of any of said articles on others thereof, and a light source and a light-sensitive cell positioned at the opposite ends of the light passage defined by said apertures.

7. Apparatus of the class described comprising a ratchet wheel, a pawl for cooperation with said wheel, electromagnetic means for moving the pawl, an energizing circuit for said electromagnetic means, means for feeding articles to be counted, means for intermittently completing said circuit in dependence upon the rate of article feed, a second energizing circuit for said electromagnetic means including an interrupter actuated in dependence upon movement of the pawl, and switch means operable to place said electromagnetic means in either circuit.

8. Apparatus of the class described comprising a ratchet wheel, a pawl for cooperation with said wheel, electromagnetic means for moving the pawl, an energizing circuit for said electromagnetic means, means for feeding articles to be counted, means for intermittently completing said circuit in dependence upon the rate of article feed, a second energizing circuit for said electromagnetic means including an interrupter actuated in dependence upon movement of the pawl, switch means operable to place said electromagnetic means in either circuit, said switch means including a rotary switch operator rotated by the ratchet wheel and having a zero position, and a switch in said second circuit opened upon movement of the operator to its zero position.

9. Apparatus of the class described comprising a ratchet wheel, a pawl for cooperation with said ratchet wheel, electromagnetic means for moving the pawl, an energizing circuit for said electromagnetic means, means for feeding articles to be counted, means for intermittently completing said energizing circuit in dependence upon the rate of article feed, a rotary switch operator driven by said ratchet wheel and having an operating position; a second ratchet wheel, cooperating pawl, electromagnetic means, and energizing circuit; a switch in said second energizing circuit closed upon movement of the operator to its operating position whereby the second ratchet wheel is advanced one step for each complete revolution of the first ratchet wheel, a plurality of rotary switch operators driven by said second ratchet wheel, article discharge control mechanism, electromagnetic means for controlling said control mechanism, switches associated with said operators for operation thereby upon different angular movements of the several operators, energizing circuits for said said last-named electromagnetic means including said last-named switches respectively, and means for selectively connecting said last-named electromagnetic means in said last-named circuits.

10. Apparatus of the class described comprising a ratchet wheel, a pawl for cooperation with said ratchet wheel, electromagnetic means for moving the pawl, an energizing circuit for said electromagnetic means, means for feeding articles to be counted, means for intermittently completing said energizing circuit in dependence upon the rate of article feed, a rotary switch operator driven by said ratchet wheel and having an operating position; a second ratchet wheel, cooperating pawl, electromagnetic means, and energizing circuit; a switch in said second energizing circuit closed upon movement of the operator to its operating position whereby the second ratchet wheel is advanced one step for each complete revolution of the first ratchet wheel, a series of rotary disks fixed on a common shaft driven by said second ratchet wheel, each disk being peripherally notched with the notches of the different disks differently spaced, feelers cooperating with the disk peripheries, switches controlled by the feelers respectively, article discharge control mechanism, electromagnetic means for controlling said control mechanism, energizing circuits for said last-named electromagnetic means including said last-named switches respectively, and means for selectively connecting said last-named electromagnetic means in said last-named circuits.

11. Apparatus of the class described comprising a ratchet wheel, a pawl for cooperation with said ratchet wheel, electromagnetic means for moving the pawl, an energizing circuit for said electromagnetic means, means for feeding articles to be counted, means for intermittently completing said energizing circuit in dependence upon the rate of article feed, a rotary switch operator driven by said ratchet wheel and having an operating position; a second ratchet wheel, cooperating pawl, electro-magnetic means, and energizing circuit; a switch in said second energizing circuit closed upon movement of the operator to its operating position whereby the second ratchet wheel is advanced one step for each complete revolution of the first ratchet wheel, a series of rotary disks fixed on a common shaft driven by said second ratchet wheel, each disk being peripherally notched with the notches of the different disks differently spaced, feelers cooperating with the disk peripheries, switches controlled by the feelers respectively, article discharge control mechanism, electromagnetic means for controlling said control mechanism, energizing circuits for said last-named electromagnetic means including said last-named switches respectively, means for selectively connecting said last-named electromagnetic means in said last-named circuits, a further rotary operator driven by the first-named ratchet wheel and having an operating position angularly spaced behind the operating position of the first-named operator, and a further switch common to said last-named circuits and closed upon movement of said further operator to its operating position.

12. Apparatus of the class described comprising a ratchet wheel having a zero position, a pawl for cooperation with said ratchet wheel, electromagnetic means for moving the pawl, an energizing circuit for said electro-magnetic means, means for feeding articles to be counted, means for intermittently completing said energizing circuit in dependence upon the rate of article feed, a zeroizing circuit for said electro-magnetic means including an interrupter actuated by said pawl; a second ratchet wheel, cooperating pawl, electro-magnetic means, energizing circuit and zeroizing circuit; a switch in said second energizing circuit, means operable to close said switch upon movement of the first-mentioned ratchet wheel to its zero position whereby the second ratchet wheel is advanced one step for each complete revolution of the first ratchet wheel, and a switch in the second zeroizing circuit closed upon movement of the first ratchet wheel to its zero position, and switch means operable to place both of said electro-magnetic means either in their respective energizing circuits or zeroizing circuits.

13. Apparatus of the class described comprising a branched chute and a control gate therefor, and means for moving the gate comprising a pair of electro-magnetic coils, a supply line having one side in connection with both coils, a switch wheel having alternating conductive and non-conductive peripheral segments and a conductive ring in connection with the conductor segments, a wiper engaging said conductor ring and in connection with the other side of the line, a pair of wipers so positioned relative to the wheel that one engages a conductive segment and the other a non-conductive segment, means for stepping the wheel to reverse the relation of said pair of wipers to the segments, conductors connecting said pair of wipers with said coils respectively, and switches interposed in said conductors and alternately actuated upon movements of the gate to break the circuit to that coil whose line connection is closed through the wheel and close the circuit for the other coil up to the wheel.

14. Apparatus according to claim 13 wherein the stepping means for the switch wheel comprises a ratchet wheel in driving connection with the switch wheel, a pawl for cooperation with the ratchet wheel, spring means for advancing the pawl, electromagnetic means for retracting the pawl, a counting wheel having a zero position thereon, an energizing circuit for said electromagnetic means, and means actuated to close said circuit as the counting wheel comes to its zero position and to immediately open the circuit as the counting wheel passes out of its zero position.

15. Apparatus of the class described comprising a branched chute and an oscillable control gate therefor, a pair of opposed solenoids and a core reciprocable thereby, an operating connection between the core and gate, a supply line having one side in connection with both solenoids, a switch wheel having alternating conductive and non-conductive peripheral segments and a conductive ring in connection with the conductive segments, a wiper engaging said conductive ring and in connection with the other side of the line, a pair of wipers so positioned relative to the wheel that one engages a conductive segment and the other a non-conductive segment, means for stepping the wheel to reverse the relation of said pair of wipers to the segments, conductors connecting said pair of wipers with said solenoids respectively, and switches interposed in said conductors and alternately actuated upon movements of the gate to break the circuit to that solenoid whose line connection is closed through the wheel and close the circuit for the other coil up to the wheel.

JAMES L. ROEMER.